(12) United States Patent
Song et al.

(10) Patent No.: US 8,873,194 B1
(45) Date of Patent: Oct. 28, 2014

(54) TOUCHDOWN DETECTION IN MAGNETIC DISK STORAGE DEVICES

(71) Applicant: LSI Corporation, San Jose, CA (US)

(72) Inventors: Xiufeng Song, San Jose, CA (US); Richard Rauschmayer, Longmont, CO (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/242,633

(22) Filed: Apr. 1, 2014

(51) Int. Cl.
*G11B 21/02* (2006.01)

(52) U.S. Cl.
USPC .......................................................... 360/75

(58) Field of Classification Search
None
See application file for complete search history.

(56) References Cited

U.S. PATENT DOCUMENTS

| | | | | |
|---|---|---|---|---|
| 4,671,120 A * | 6/1987 | Fowler | | 73/291 |
| 4,933,784 A * | 6/1990 | Oldershaw et al. | | 360/77.16 |
| 5,486,963 A * | 1/1996 | Jones, Jr. | | 360/244.3 |
| 5,734,522 A * | 3/1998 | Shrinkle | | 360/235.4 |
| 6,169,240 B1 * | 1/2001 | Suzuki | | 84/605 |
| 6,275,345 B1 * | 8/2001 | Ottesen et al. | | 360/25 |
| 6,563,673 B2 * | 5/2003 | Mundt et al. | | 360/135 |
| 7,193,799 B2 | 3/2007 | Chung | | |
| 7,468,856 B2 * | 12/2008 | Fitzpatrick et al. | | 360/75 |
| 7,796,356 B1 | 9/2010 | Fowler et al. | | |
| 8,665,547 B1 * | 3/2014 | Yeo et al. | | 360/55 |
| 2012/0120521 A1 | 5/2012 | Kurita et al. | | |
| 2013/0083430 A1 | 4/2013 | Chiu et al. | | |
| 2013/0170068 A1 | 7/2013 | Natori | | |
| 2013/0308220 A1 | 11/2013 | Che et al. | | |

* cited by examiner

*Primary Examiner* — Peter Vincent Agustin
(74) *Attorney, Agent, or Firm* — Hamilton DeSanctis & Cha

(57) ABSTRACT

Touchdown detection in magnetic storage devices is provided to detect contact between a storage medium and a magnetic head having an embedded contact sensor. A sample stream is obtained, which includes samples of a sensor signal output from the embedded contact sensor. The sample stream is segmented into multiple segments. A modulation depth is determined for each of the segments. A combined modulation depth is determined by combining the modulation depths of the segments using a weighting function. The combined modulation depth is compared with a threshold. A determination is made as to whether the magnetic head makes contact with the storage medium based on a result of the comparing.

20 Claims, 13 Drawing Sheets

800

IDLE MODE - NO TOUCHDOWN

900

IDLE MODE - TOUCHDOWN

TOUCHDOWN DETECTION IN MAGNETIC DISK STORAGE DEVICES

FIELD OF THE INVENTION

The field generally relates to touchdown detection in magnetic disk storage devices and, in particular, to circuits and methods for implementing resonance detection with embedded contact sensors to detect contact between a magnetic head and a magnetic storage disk.

BACKGROUND

Disk-based storage devices such as hard disk drives are used to provide non-volatile data storage in a wide variety of data processing systems. A typical hard disk drive comprises a spindle that holds one or more flat circular storage disks. In a magnetic disk storage device, each storage disk comprises a substrate made from a non-magnetic material, such as aluminum or glass, which is coated with one or more thin layers of magnetic material. In operation, data is read from and written to tracks of the magnetic storage disk via a magnetic head having one or more read and write sensors. Typically, magnetic disk storage devices implement fly height control circuitry to control and adjust the clearance between the magnetic head and the surface of the magnetic storage disk. To maximize the device performance, it is important to minimize the spacing between the read and write sensors and the magnetic storage disk. However, as the required spacing decreases to meet higher performance requirements, the probability of contact between a magnetic head and storage disk also increases. Such contact is undesirable as it can cause damage to the magnetic surface of the storage disk and/or cause damage to the read and write sensors in the magnetic head. Consequently, such damage can lead to loss of data and overall operational failure of the magnetic disk storage device. A conventional method of detecting contact between a magnetic head and a magnetic storage disk utilizes an embedded contact sensor within the magnetic head. The embedded contact sensor generates contact sensor signals that are used to detect when the magnetic head has made contact with the storage disk. However, the effectiveness of such contact detection scheme can diminish due to signal noise that corrupts the contact sensor signal, wherein sources of signal noise include interference from magnetic signals on the magnetic storage disk or write currents that are generated during write operations, etc.

SUMMARY

In an embodiment of the invention, a method is provided to detect contact between a storage medium and a magnetic head having an embedded contact sensor. A sample stream is obtained, which includes samples of a sensor signal output from the embedded contact sensor. The sample stream is segmented into multiple segments. A modulation depth is determined for each of the segments. A combined modulation depth is determined by combining the modulation depths of the segments using a weighting function. The combined modulation depth is compared with a threshold. A determination is made as to whether the magnetic head makes contact with the storage medium based on a result of the comparing.

Other embodiments include, without limitation, circuits, systems, integrated circuit devices, storage devices, storage systems, and computer-readable media.

WRITTEN DESCRIPTION

Figure 1:
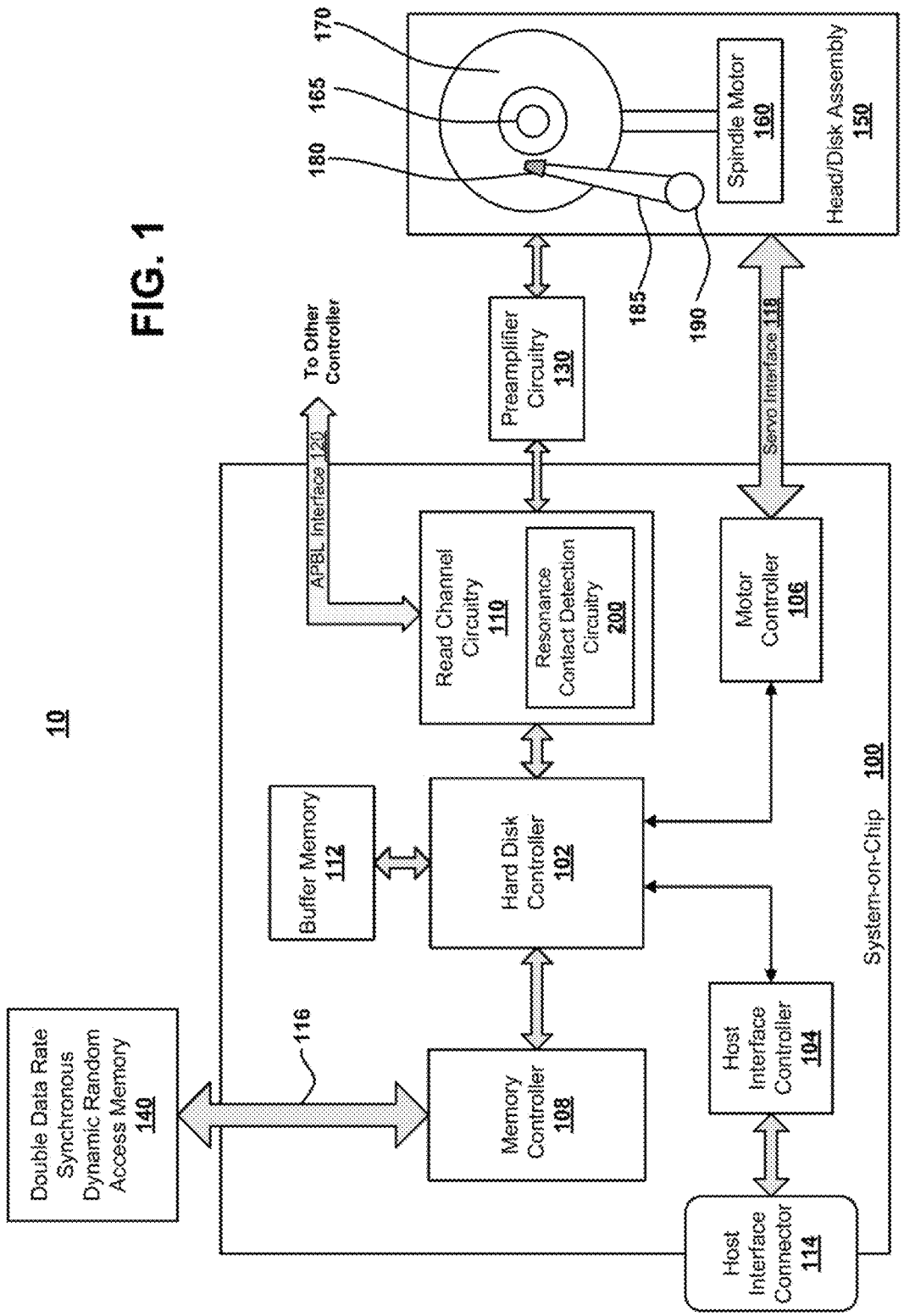
FIG. 1 schematically illustrates a storage device according to an embodiment of the invention.

FIG. 1 schematically illustrates a storage device 10 according to an embodiment of the invention. The storage device 10 comprises a system-on-chip 100 which includes various integrated circuits such as a hard disk controller 102, a host interface controller 104, a motor controller 106, a memory controller 108, read channel circuitry 110, and a buffer memory 112. The system-on-chip 100 further comprises a plurality of interfaces such as a host interface connector 114, a memory interface 116, a servo interface 118, and a bidirectional APBL (Advanced Peripheral Bus-Light) interface 120. The storage device 10 further comprises preamplifier circuitry 130, an external random access memory 140, and a read/write head and disk assembly 150.

The read/write head and disk assembly 150 comprises various components such as a spindle motor 160 and spindle 165, a storage medium 170, a magnetic read/write head 180 (or simply, "magnetic head") disposed on one end of a positioning arm 185, and an actuator motor 190 (or voice coil motor) connected to one end of the positioning arm 185 opposite the magnetic head 180. The storage medium 170 has a storage surface coated with one or more magnetic materials that are capable of storing data bits in the form of respective groups of media grains oriented in a common magnetization direction (e.g., up or down). The storage medium 170 is connected to the spindle 165, and the spindle 165 is driven by the spindle motor 160 to spin the storage medium 170 at high speed. Data is read from and written to the storage medium 170 via the magnetic head 180 mounted on the positioning arm 185. The actuator motor 190 comprises a permanent magnet and a moving coil motor, which operate to controllably swing the magnetic head 180 into a desired position across the magnetic surface of the storage medium 170 as the storage medium 170 spins by operation of the spindle motor 160.

In general, a sequence of magnetic flux transitions corresponding to a digital data sequence are written onto the magnetic surface of the storage medium 170 using the magnetic head 180. The digital data sequence serves to modulate current in the read/write head 180. The magnetic surface of storage medium 170 comprises a plurality of concentric tracks, wherein each track is subdivided into a plurality of sectors that are capable of storing a block of sector data for subsequent retrieval. The tracks located toward the outside edge of the storage medium 170 have a larger circumference when compared to those located toward the center of the storage medium 170. The tracks are grouped into several annular zones, where the tracks within a given zone have the same number of sectors. Those tracks in the outer zones have more sectors than those located in the inner zones. The outer zones of the storage medium 170 provide a higher data transfer rate than the inner zones. This is in part due to the fact that the storage medium 170, once accelerated to rotate at operational speed, spins at a constant angular or radial speed regardless of the positioning of the magnetic head 180, but the tracks of the inner zones have smaller circumference than those of the outer zones. Thus, when the read/write head 180 is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention. Data bit density is generally constant across the entire storage surface of the storage medium 170, which results in higher data transfer rates at the outer zones. Moreover, the storage medium 170 further comprises timing patterns formed on the surface thereof, which comprise one or more sets of servo address marks (SAMs) or other types of servo marks formed in particular sectors in a conventional manner.

The host interface connector 114 represents a physical connector and associated input/output (I/O) bus wiring that connects the storage device 10 to a host system, device, I/O bus, or other components of a data processing system. The I/O data is moved to and from the storage device 10 through the host interface connector 114 under control of the host interface controller 104. The host interface controller 104 implements communication protocols for communicating with a host system or device and controlling and managing data I/O operations, using one or more known interface standards. For example, in one or more alternative embodiments of the invention, the host interface connector 114 and the host interface controller 104 are implemented using one or more of Small Computer interface (SCSI), Serial Attached SCSI (SAS), Serial Advanced Technology Attachment (SATA) and/or Fibre Channel (FC) interface standards, for example.

The hard disk controller 102 controls the overall operations of writing and reading data to and from the storage medium 170. In one embodiment of the invention, the hard disk controller 102 is an ARM (Advanced Reduced instruction set computing Machine). In other embodiments, the hard disk controller 102 may comprise other known architectures suitable for controlling hard disk operations. The read channel circuitry 110 encodes and decodes data that is written to and read from the storage medium 170 using the magnetic head 180. The read channel circuitry 110 comprises resonance contact detection circuitry 200 for processing a digital sample stream comprising samples of an analog contact sensor signal (generated by an embedded contact sensor disposed in the magnetic head 180) to detect contact between the magnetic head 180 and the storage medium 170. The resonance contact detection circuitry 200 implements circuits and methods as will be discussed in further detail below with reference to FIGS. 2, 4, 5 and 6, for example, according to embodiments of the invention. The read channel circuitry 110 comprises other types of circuitry that is commonly implemented to process data that is read from and written to the storage medium 170.

The APBL interface 120 is used to access internal registers of the read channel circuitry 110. Depending on the storage system architecture, a controller (e.g., on-chip controller, off-chip controller, or remote controller that is external to the storage device 10) can be connected to the read channel circuitry 110 via the APBL interface 120, as necessary, to access internal registers and program the read channel circuitry 110.

The preamplifier circuitry 130 is connected between the read channel circuitry 110 and the magnetic head 180. In one embodiment, the preamplifier circuitry 130 is disposed proximate to a pivot location of the actuator motor 190. Thin printed-circuit cables are used to connect the magnetic head 180 to the preamplifier circuitry 130. The preamplifier circuitry 130 amplifies an analog signal output from the magnetic head 180 for input to the read channel circuitry 110 and provides a bias voltage for magnetic sensors of the magnetic head 180.

The motor controller 106 is connected to the head/disk assembly 150 via the servo interface 118. The motor controller 106 sends control signals to the spindle motor 160 and actuator motor 190 through the servo interface 118 during read and write operations to spin the storage medium 170 and move the magnetic head 180 into a target position. In particular, for a typical read operation, signals for performing a read operation are received through the host interface connector 114 and sent to the hard disk controller 102 through the host interface controller 104. The hard disk controller 102 processes the read signals for performing the read operation and then sends control signals to the motor controller 106 for controlling the actuator motor 190 and spindle motor 160 for the read operation. Additionally, the hard disk controller 102 sends the processed read signals to the read channel circuitry 110, which are then sent to the actuator motor 190 through the preamplifier circuitry 130 to perform the read operation. The actuator motor 190 positions the magnetic head 180 over a target data track on storage medium 170 in response to control signals received by the motor controller 106 and the read channel circuitry 110. The motor controller 106 also generates control signals to drive the spindle motor 160 to spin the storage medium 170 under the direction of the hard disk controller 102. The spindle motor 160 spins the storage medium 170 at a determined spin rate.

When the magnetic head 180 is positioned adjacent a target data track, magnetic signals representing data on the storage medium 170 are sensed by magnetic head 180 as the storage medium 170 is rotated by the spindle motor 160. The sensed magnetic signals are provided as continuous, minute analog signals representative of the magnetic data on the storage medium 170. The analog signals are transferred from the magnetic head 180 to the read channel circuitry 110 via the preamplifier circuitry 130. The preamplifier circuitry 130 amplifies the analog signals accessed from storage medium 170, and the read channel circuitry 110 decodes and digitizes the received analog signals to recreate the information originally written to the storage medium 170. The data read from the storage medium 170 is then output to a host system or device through the host interface controller 104 and host interface connector 114 under control of the hard disk controller 102.

A write operation is substantially the opposite of a read operation. For example, in one embodiment, write signals for performing write operations are received through the host interface connector 114, wherein the write signals represent commands to perform a write operation and/or data that is to be written to the storage medium 170. The write signals are sent to the hard disk controller 102 through host interface controller 104. The hard disk controller 102 processes the write signals for performing the write operation and then sends control signals to the motor controller 106 for controlling the actuator motor 190 and spindle motor 160 for the write operation. Additionally, the hard disk controller 102 sends the processed write signals (and formatted data) to the read channel circuitry 110, wherein the formatted data to be written is encoded. The write signals (control and data) are then sent to the actuator motor 190 through the preamplifier circuitry 130 to perform a write operation by writing data to the storage medium 170 via the magnetic head 180.

In the embodiment of FIG. 1, the external random access memory 140 is an external memory relative to the system-on-chip 100 and other components of the storage device 10, but is nonetheless internal to the storage device 10. In one embodiment, the external random access memory 140 is a double data rate synchronous dynamic random access memory, although a wide variety of other types of memory may be used in alternate embodiments. The external random access memory 140 is initialized by the memory controller 108. The memory controller 108 performs signaling control of the external random access memory 140 on behalf of the hard disk controller 102, whereby initialization of the external random access memory 140 is implemented via the programming of configuration registers in the memory controller 108 by the hard disk controller 102. In operation, the memory controller 108 generates internal clock pulses for synchronizing data write operations and read operations of the external random access memory 140. The internal clock signals and data are transmitted to and from the external random access memory 140 via the memory interface 116 (which is a data/signal bus).

In one embodiment of the invention, the external random access memory 140 serves as a buffer memory for data transfers between a host system/device and the storage device 10. For example, the read and or write signals (as discussed above) that are received by the hard disk controller 102 from the host interface controller 104 can be temporarily stored in the external random access memory 140 before being processed by the hard disk controller 102 and the read channel circuitry 110, for example. Moreover, data that is read out from the storage medium 170 may be temporarily stored in the external random access memory 140 before being packaged and output to a host system/device by operation of the hard disk controller 102 and the host interface controller 104. This buffering optimizes the throughput of the storage device 10 by matching disparate processing and data transmission speeds as data passes to and from the storage medium 170.

The buffer memory 112 comprises on-chip memory that is used by the hard disk controller 102 to temporarily store data and/or instructions for performing read/write operations. In one embodiment of the invention, the internal buffer memory 112 is used by the system-on-chip 100 as a buffer memory for normal functional mode operations. In one embodiment of the invention, the internal memory buffer 112 is used as a LLI (Long Latency Interface) buffer memory for normal functional mode operations of the system-on-chip 100.

It is to be understood that the external random access memory 140, system-on-chip 100 and preamplifier circuitry 130 shown in FIG. 1 collectively represent one embodiment of "control circuitry" as that term is utilized herein. Numerous alternative embodiments of "control circuitry" include a subset of the components 100, 130 and 140 or portions of one or more of these components. For example, the system-on-chip 100 itself may be viewed as an example of "control circuitry" to process data received from and supplied to the magnetic head 180 and to control positioning of the magnetic head 180 relative to the storage medium 180. Certain operations of the system-on-chip 100 in the storage device 10 of FIG. 1 may be directed by the hard disk controller 102, which executes code stored in the external random access memory 140 and/or the internal buffer memory 112, for example. Thus, at least a portion of the control functionality of the storage device 10 may be implemented at least in part in the form of software code.

Furthermore, although the embodiment of FIG. 1 illustrates various components of the system-on-chip 100 being implemented on a single integrated circuit chip, the system-on-chip 100 may include other integrated circuits, such as the external random access memory 140 or the preamplifier circuitry 130, or portions thereof. Moreover, the hard disk controller 102, host interface controller 104, and motor controller 106, may be implemented using suitable integrated circuit architectures such as microprocessor, digital signal processor (DSP), application-specific integrated circuit (ASIC), or field-programmable gate array (FPGA), or other types of integrated circuit architectures.

While FIG. 1 shows an embodiment of the invention with one instance of each of the single storage medium 170, magnetic head 180, and positioning arm 185, it is to be understood that in an alternate embodiment of the invention, the storage device 10 comprises multiple instances of one or more of these or other drive components. For example, in an alternative embodiment of the invention, the storage device 10 comprises multiple storage disks attached to the same spindle such that each storage disk rotates at the same speed, as well as multiple magnetic read/write heads and associated positioning arms coupled to one or more actuators. Moreover, it is to be understood that a read/write head as that term is broadly used herein may be implemented in the form of a combination of separate read and write heads. More particularly, the term "read/write" as used herein is intended to be construed broadly as read and/or write, such that a read/write head may comprise one or more read heads only, one or more write heads only, a single head used for both reading and writing, or a combination of separate read and write heads. Such heads may comprise, for example, write heads with wrap-around or side-shielded main poles, or any other types of heads suitable for recording and/or reading data on a storage disk.

In addition, the storage device 10 as illustrated in FIG. 1 may include other elements in addition to, or in place of, those specifically shown, including one or more elements of a type commonly found in conventional storage devices. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

As noted above, the read channel circuitry 110 comprises resonance contact detection circuitry 200 for processing a digital sample stream comprising samples of an analog contact sensor signal to detect when contact is made between the magnetic head 180 and the storage medium 170. In general, the resonance contact detection circuitry 200 implements a method for touchdown detection, which comprises obtaining a sample stream comprising samples of a sensor signal output from an embedded contact sensor (disposed in the magnetic head 180), segmenting the sample stream into a plurality of segments, determining a modulation depth for each of the segments, determining a combined modulation depth by combining the modulation depths of the segments using a weighting function, comparing the combined modulation depth with a threshold, and determining if the magnetic head 180 makes contact with the storage medium 170 based on a result of the comparing. Embodiments of contact detection schemes will now be discussed in further detail with reference to FIGS. 2, 3, 4, 5 and 6, for example.

Figure 2:
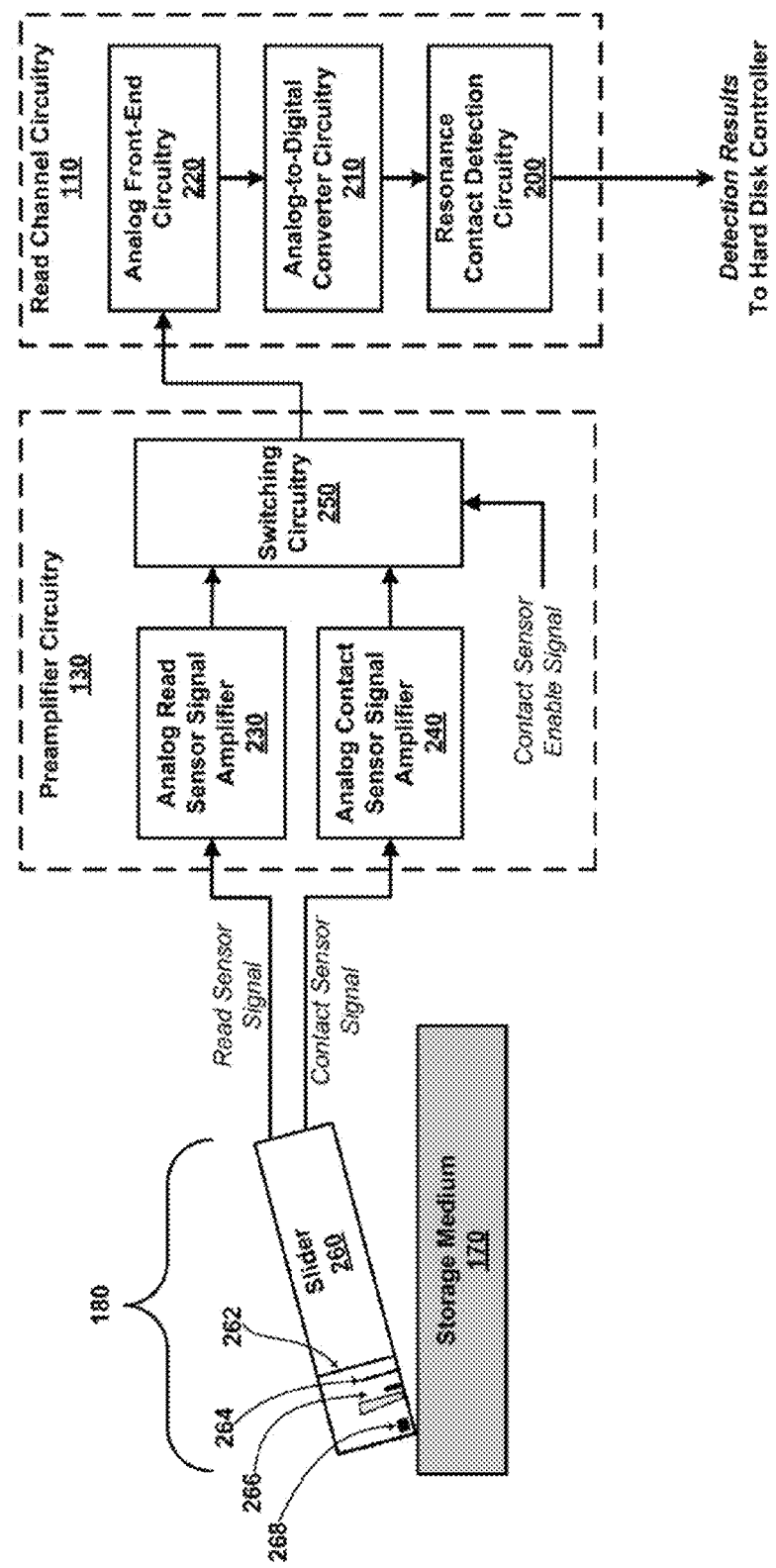
FIG. 2 schematically illustrates a more detailed embodiment of the storage device of FIG. 1, which comprises detection circuitry to detect contact between a magnetic head and a storage medium, according to an embodiment of the invention.

FIG. 2 is a schematic block diagram showing components of a storage device which are utilized for resonance contact detection according to an embodiment of the invention. More specifically, FIG. 2 illustrates details of the magnetic head 180, the preamplifier circuitry 130, and the read channel circuitry 110, of the storage device 10 of FIG. 1, which are utilized to implement a resonance contact detection framework, according to an embodiment of the invention. As shown in FIG. 2, in addition to the resonance contact detection circuitry 200, the read channel circuitry 110 comprises analog-to-digital converter circuitry 210, and analog front-end circuitry 220. Moreover, the preamplifier circuitry 130 comprises an analog read sensor signal amplifier 230, an analog contact sensor signal amplifier 240, and switching circuitry 250. Further, as schematically depicted in FIG. 2, the magnetic head 180 comprises a slider 260 that supports a magnetic head element 262. In general, the magnetic head element 262 comprises a thermal actuator 264, one or more magnetic sensor elements 266 (read and/or write sensors), and an embedded contact sensor 268.

The various components of the magnetic head 180 can be implemented using structures and techniques that are well known in the art and consequently, a detailed explanation of such components is not necessary for understanding embodiments of the invention. Briefly, the slider 260 is configured to move back and forth in a radial direction over the surface of the storage medium 170 so that the magnetic head element 262 can access different tracks of the storage medium 170 where target data is stored. The thermal actuator 264 operates as a heater element (e.g., resistive heater element) to generate heat in the vicinity of the magnetic sensor elements 266, which causes the tip of the magnetic head element 262 (that contains the magnetic sensor elements 266) to move closer to the surface of the storage medium 170 via a heater actuation process.

As is known in the art, a magnetic storage device typically comprises fly height control circuitry that controllably adjusts a gap distance (or fly height) between the magnetic head element 262 and the surface of the storage medium 170. In general, the fly height control circuitry includes a power amplifier and other support circuitry to generate and regulate either a programmed power level or voltage to the thermal actuator 264 to control the heating of the magnetic head element 262 and, thereby, control the spacing between the surface of the storage medium 170 and the magnetic sensor elements 266. The fly height control circuitry comprises a gap sensor (e.g., metallic needle) which generates a sensor current (or tunneling current) as the magnetic head element 262 approaches the surface of the storage medium 170, wherein the tunneling current increases as the gap sensor approaches the surface of the storage medium 170. In general, the amount of sensor current generated by the gap sensor is a sum of multiple currents generated by different current sources, but a primary component of the sensor current includes a "tunneling current" that is generated by the gap sensor as a function of a bias voltage (applied to the gap sensor) and a gap distance between the gap sensor and the surface of the storage medium 170. The sensor current increases as the gap sensor approaches the surface of the storage medium 170.

As the heater actuation process nudges the magnetic head element 262 closer to the surface of the storage medium 170, the sensor current is input to, and processed by, tunneling current sensor circuitry to detect when the magnetic head element 262 is positioned at some predefined distance (gap) from the surface of the storage medium 170 (which is deemed sufficient to properly perform a read or write operation) based on a magnitude of the sensor current. When the sensor current is determined to have reached a predefined reference level, the tunneling current sensor circuitry generates a control signal which indicates that the magnetic head element 262 is determined to be positioned at the predefined (gap) distance from the surface of the storage medium 170, which is sufficient to perform a read or write operation. This control signal causes the fly height control circuitry to control the heater actuation process so that the magnetic head element 262 stops moving toward the surface of the storage medium 170.

In order to maximize the performance of the storage device 10, it is important to minimize the magnetic spacing between the magnetic sensor elements 266 and the surface of the storage medium 170. However, as the predefined gap distance decreases, there is an increased probability of undesired contact between the magnetic head element 262 and the storage medium 170 for various reasons understood by those of ordinary skill in the art. In this regard, the embedded contact sensor 268 is implemented to detect when contact occurs (i.e., touchdown) between the magnetic head element 262 and the storage medium 170.

In particular, as schematically depicted in FIG. 2, the embedded contact sensor 268 is disposed in a region where contact occurs between the magnetic head element 262 and the storage medium 170. In one embodiment, the embedded contact sensor 268 comprises a thermoresistive element having an electrical resistance which changes in response to fictional heating that occurs (in the region where the embedded contact sensor 268 is disposed) when the magnetic head element 262 makes contact with the moving surface of the storage medium 170. A bias voltage is applied across the thermoresistive element of the embedded contact sensor 268. The embedded contact sensor 268 generates a sensor current based on the bias voltage and resistance of the thermoresistive element of the embedded contact sensor 268. The sensor current generated by the embedded contact sensor 268 is output from the magnetic head 180 as an analog contact sensor signal, which is processed using resonance contact detection techniques (as discussed below) to detect a touchdown event (i.e., then the magnetic head 180 makes contact to the surface of the storage medium 170).

As shown in FIG. 2, the preamplifier circuitry 130 receives a read sensor signal and a contact sensor signal, which are output from the magnetic head 180. The read sensor signal is an analog signal that is generated when the magnetic head 180 performs a read operation to read data that is stored on the storage medium 170. The read sensor signal is input to and amplified by the analog read sensor signal amplifier 230. Moreover, as noted above, the contact sensor signal is an analog signal that is generated by the embedded contact sensor 268. The contact sensor signal is input to and amplified by the analog contact sensor signal amplifier 240. The switching circuitry 250 is connected to output of the analog read sensor signal amplifier 230 and the analog contact sensor signal amplifier 240. The switching circuitry 250 is configured to switchably connect either the output of the analog read sensor signal amplifier 230 or the analog contact sensor signal amplifier 240 to the read channel circuitry 110, based on a control signal.

More specifically, in one embodiment, the switching circuitry 250 is controlled by a contact sensor enable signal to selectively output the amplified contact sensor signal to the read channel circuitry 110 when the read channel is not performing a servo operation or a read operation. In one embodiment of the invention, the contact sensor enable signal is generated by, e.g., the hard disk controller 102 (FIG. 1). The switching circuitry 250 is controlled so that the amplified contact sensor signal is switchably routed to the read channel circuitry 110 during write operations (write mode), or during idle periods (idle mode) or during both write operations and idle periods. In this manner, contact sensor signal data can be made available during write and/or idle modes, but not available during data read or servo operations. As explained in further detail below, a contact detection process implemented by the resonance contact detection circuitry 200 is performed on portions of the contact sensor signal generated between successive servo operations during an idle mode and/or between successive servo operations during a write mode.

The analog front-end circuitry 220 comprises circuitry for analog signal processing the amplified read sensor signals and amplified contact sensor signals received from the preamplifier circuitry 130. The analog front-end circuitry 220 comprises various types of circuit blocks that are typically included in front-end circuitry of read channels. Such circuit blocks include, for example, a variable gain amplifier (VGA), and a continuous time filter. By way of example, FIG. 3 is a block diagram of analog front-end circuitry according to an embodiment of the invention, which can be used to implement the analog front-end circuitry 220 of FIG. 2.

Figure 3:
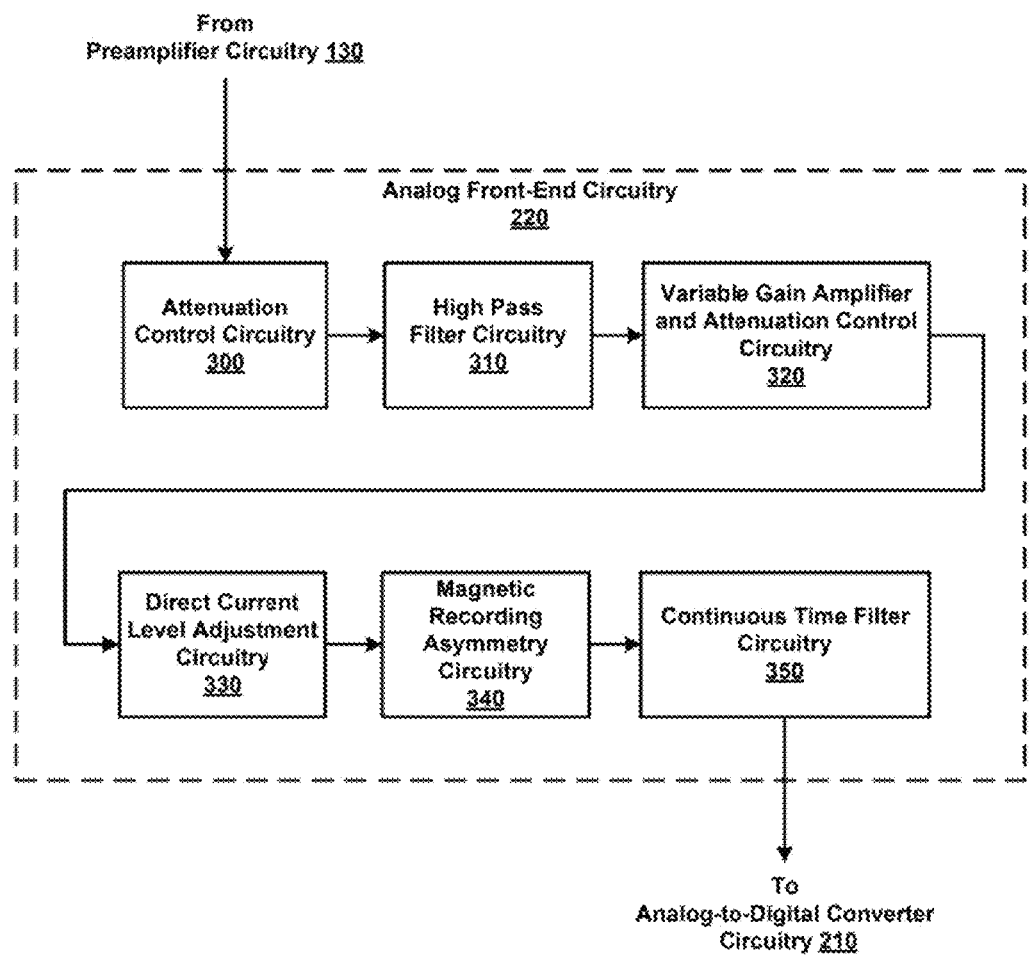
FIG. 3 is a block diagram of analog front-end circuitry according to an embodiment of the invention.

In particular, FIG. 3 illustrates an embodiment of the analog front-end circuitry 220 comprising attenuation control circuitry 300, high pass filter circuitry 310, variable gain amplifier and attenuation control circuitry 320, direct current level adjustment circuitry 330, magnetic recording asymmetry circuitry 340 and continuous time filter circuitry 350. These components have well-known functions, so a detailed explanation thereof is not needed. In general, the high pass filter circuitry 310 implements an analog high pass filter to filter out high frequency components in a contact sensor signal. As explained below, this high-pass filtering serves to optimize a touchdown detection process implemented by the resonance contact detection circuitry 200. The variable gain amplifier and attenuation control circuitry 320 adjusts the amplitude of the analog signal to a value that is suitable for a dynamic range of the downstream analog-to-digital converter circuitry 210. The continuous time filter circuitry 350 is a pulse-shaping filter, which serves to filter the gain-adjusted analog signal for anti-aliasing purpose and provide a proper high frequency boost, and output a filtered analog signal. In one embodiment, a continuous time filter is a low-pass filter that filters the analog signal before it is sampled to reduce the effects of aliasing.

Referring back to FIG. 2, the analog-to-digital converter circuitry 210 receives an amplified/filtered version of the analog contact sensor signal output from the analog front-end circuitry 220, and samples the signal in response to a sample clock to convert the amplified/filtered version of the analog contact sensor signal into a sample stream. The sample stream is a time-sequenced digital signal comprising samples of the contact sensor signal output from the embedded contact sensor 268. The contact sensor signal sample stream is input to, and processed by, the resonance contact detection circuitry 200 to detect if the magnetic head 180 makes contact with the storage medium 170.

Figure 4:
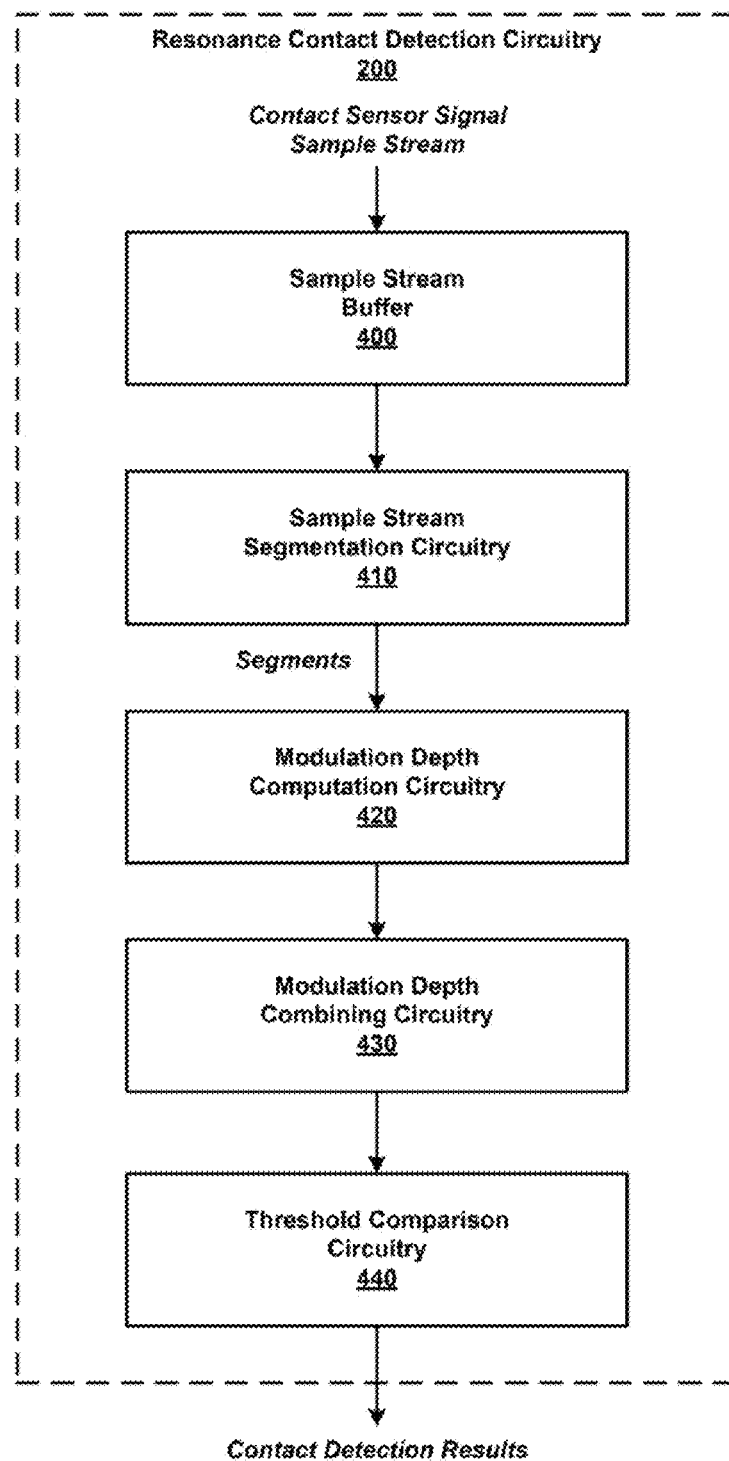
FIG. 4 is a block diagram of resonance contact detection circuitry to detect contact between a magnetic head and a storage medium, according to an embodiment of the invention.

FIG. 4 is a block diagram of resonance contact detection circuitry to detect contact between a magnetic head and a storage medium, according to an embodiment of the invention. In particular, FIG. 4 illustrates an embodiment of the resonance contact detection circuitry 200 comprising a sample stream buffer 400, sample stream segmentation circuitry 410, modulation depth computation circuitry 420, modulation depth combining circuitry 430, and threshold comparison circuitry 440. The sample stream buffer 400 is configured to temporarily buffer a contact sensor signal sample stream that is output from the analog-to-digital converter circuitry 210 (FIG. 2). The segmentation circuitry 410 is configured to segment the sample stream into a plurality of segments. The modulation depth computation circuitry 420 is configured to compute a modulation depth for each of the segments output from the segmentation circuitry 410. The modulation depth combining circuitry 430 is configured to determine a combined modulation depth by combining the modulation depths of the segments using a weighting function. The threshold comparison circuitry 440 is configured to compare the combined modulation depth with a threshold. The resonance contact detection circuitry 200 is configured to determine if the magnetic head 180 makes contact with the storage medium 170 based on a comparing result (or contact detection results) output from the threshold comparison circuitry 440. The contact detection results are sent to the hard disk controller 102 (FIG. 1). Details regarding the functions of each of the circuit components of the resonance contact detection circuitry 200 will be described in further detail below.

In general, the resonance contact detection circuitry 200 is essentially a fluctuation (or amplitude variation) detector, which takes into consideration that the contact sensor signal generated by the embedded contact sensor 268 includes a significant resonance component (or sinusoidal component). The amplitude of such resonance component will significantly vary depending on whether or not there is actual touchdown, as illustratively shown in FIGS. 8 and 9, for example. In particular, FIG. 8 graphically illustrates an analog contact sensor signal 800 as measured during an idle mode of operation in which no contact was made between a magnetic head and storage medium. FIG. 9 graphically illustrates an analog contact sensor signal 900 as measured during an idle mode of operation in which contact was made between a magnetic head and storage medium.

Figure 8:
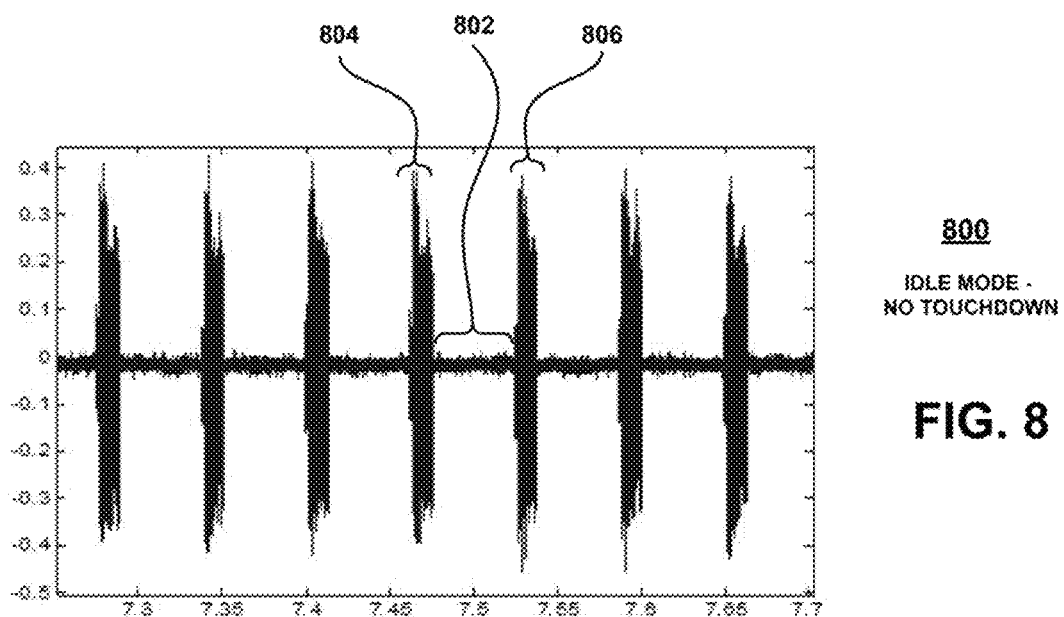
FIG. 8 graphically illustrates an analog contact sensor signal as measured during an idle mode of operation in which no contact was made between a magnetic head and storage medium.
Figure 9:
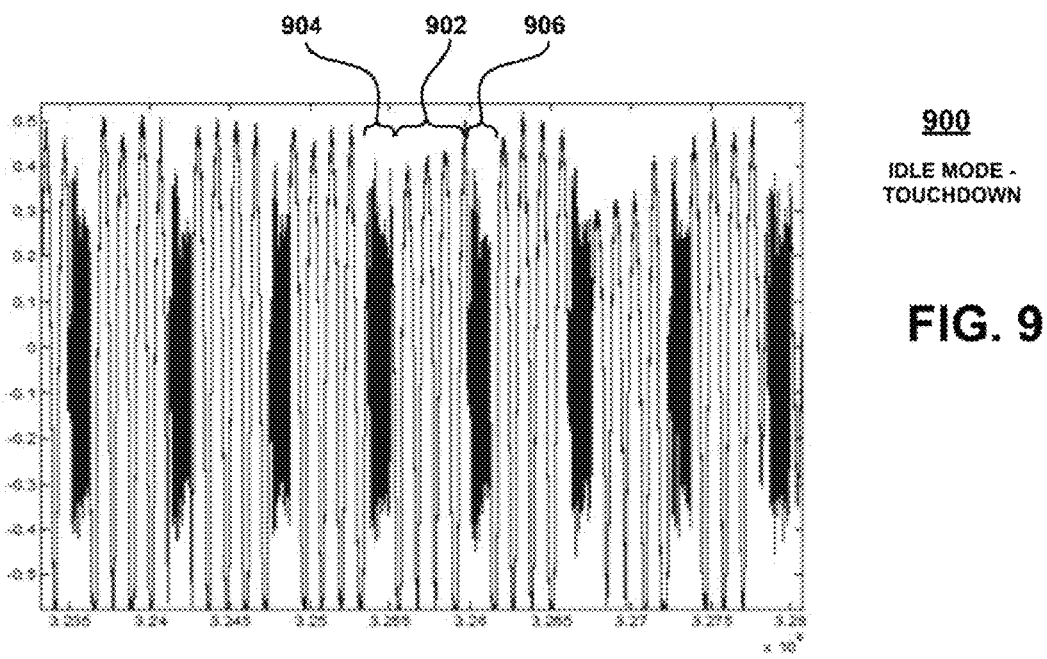
FIG. 9 graphically illustrates an analog contact sensor signal as measured during an idle mode of operation in which contact was made between a magnetic head and storage medium.

As shown in FIG. 8, when the storage device is operating in idle mode (no read or write operation) and no touchdown occurs, a portion 802 of the analog contact sensor signal 800 between two successive portions 804 and 806 of the analog contact sensor signal 800 (which correspond to successive servo gate operations) manifests as thermal noise with a weak amplitude fluctuation. On the other hand, as shown in FIG. 9, when the storage device is operating in idle mode and touchdown occurs, a portion 902 of the analog contact sensor signal 900 between two successive portions 904 and 906 of the analog contact sensor signal 900 (which correspond to successive servo gate operations) manifests as a significant resonant component (sinusoid) having a large amplitude fluctuation. In this regard, a resonance detector according to an embodiment of the invention is implemented to effectively discriminate between the two different events (i.e., touchdown or no touchdown) based on the disparity in the magnitude of the amplitude fluctuations of the analog contact sensor signal as detected between successive servo operations for the different events.

In general, resonance detection schemes according to embodiments of the invention are based on computing modulation depths for segments of the analog contact sensor signal between successive servo operations. If the contact sensor signal has a large fluctuation, the computed modulation depth will be large. On the other hand, if the contact sensor signal does not have significant fluctuation, the computed modulation depth will be small. More specifically, assume that a segment x of a digital contact sensor signal sample stream between successive servo operations comprises M samples, i.e.:

$$x=[x_1,x_2,\ldots,x_M].$$

The segment x of the digital contact sensor signal sample stream is segmented into N segments, wherein each segment comprises K samples, such that M=N×K. A next step comprises determining a summation value for each of the N segments of K samples, wherein the summation value $y_i$ for a given segment i is determined as a summation of absolute values of samples of the given segment using Equation (1) as follows:

$$y_i = \sum_{k=1}^{K} |x_{(i-1)K+k}|$$

Next, a maximum summation value is determined over the set of summation values determined for the N segments, using Equation (2) as follows:

$$y_{max} \triangleq \max\{y_i|,1\leq i\leq N\}$$

Next, a minimum summation value is determined over the set of summation values determined for the N segments, using Equation (3) as follows:

$$y_{min} \triangleq \min\{y_i|,1\leq i\leq N\}$$

Then, using the minimum and maximum summation values $y_{min}$ and $y_{max}$ that were determined for the given segment x, a modulation depth MD is determined for the given segment x using Equation (4) as follows:

$$MD = \frac{y_{max} - y_{min}}{y_{max} + y_{min}}.$$

The computed modulation depth MD for a given segment x of samples between two successive servo operation is compared to a predefined modulation depth threshold to determine if contact occurs between a magnetic head and a storage medium. For the analog contact sensor signal 800 shown in FIG. 8, the computed MD for the given portion 802 of the analog contact sensor signal would fall within a range closer to zero, thereby providing an indication that no touchdown has occurred. On the other hand, for the analog contact sensor signal 900 shown in FIG. 9, the computed MD for the given portion 902 of the analog contact sensor signal 900 would fall within a range closer to 1 (which meets or exceeds a predefined MD threshold), thereby providing an indication that touchdown has occurred.

Due to normalization in the modulation depth computation process, the computed modulation depth MD is invariant to the entire scaling of the amplitude of the contact sensor signal, and this amplitude invariant characteristic ensures that the computed modulation depth MD will always be a value in a range from 0 to 1. In this regard, a resonance detection scheme which is based on computing a modulation depth allows a manufacturer to specify a range of modulation depth threshold values between 0 and 1, from which a customer can conveniently select a threshold value with guaranteed precision in the threshold detection process.

While the implementation of a resonance detection scheme as outlined above (based on computing a single modulation depth for each segment using Equations (1)-(4)) provides an effective and reliable touchdown detection framework, it has been found that a small interference in the analog contact sensor signal can significantly alter the computed modulation depth for a given segment of contact signal data between successive servo gate operations. In other words, the modulation depth is noise sensitive for a weak contact sensor signal. For example, an analog contact sensor signal that is generated by an embedded contact sensor during a write mode of operation may contain a significant amount of noise due to interference caused by the write current generated when writing data to a storage medium. Such interference can undesirably alter the computed modulation depths leading to degraded performance in touchdown detection, as illustratively shown in FIGS. 10 and 11, for example.

Figure 10:
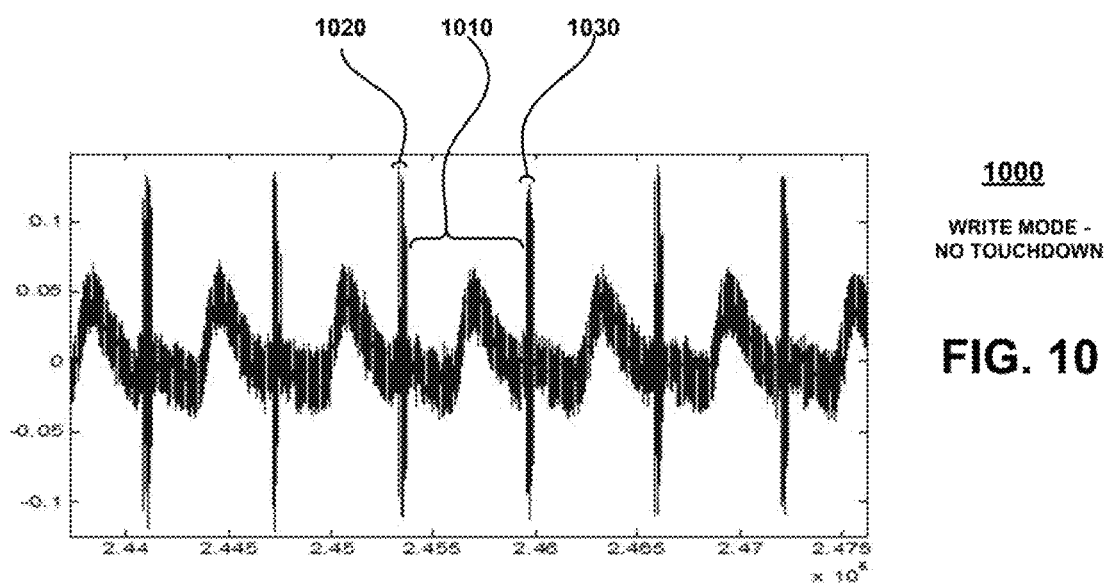
FIG. 10 graphically illustrates an analog contact sensor signal as measured during a write mode of operation in which no contact was made between a magnetic head and storage medium.
Figure 11:
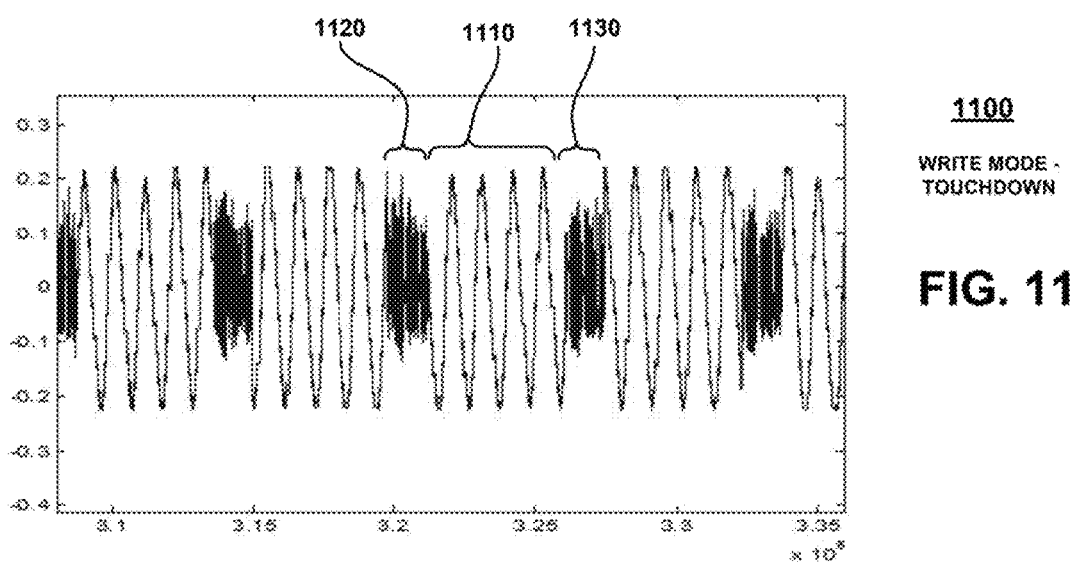
FIG. 11 graphically illustrates an analog contact sensor signal as measured during a write mode of operation in which contact was made between a magnetic head and storage medium.

FIG. 10 graphically illustrates an analog contact sensor signal 1000 as measured during a write mode of operation in which no contact was made between a magnetic head and storage medium. FIG. 11 graphically illustrates an analog contact sensor signal 1100 as measured during a write mode of operation in which contact was made between a magnetic head and storage medium. As shown in FIG. 10, when the storage device is operating in write mode and no touchdown occurs, a portion 1010 of the analog contact sensor signal 1000 between two successive portions 1020 and 1030 of the analog contact sensor signal 100 (which correspond to successive servo gate operations) manifests a relatively large signal fluctuation due to signal interference caused by write current. This is contrasted with FIG. 8 wherein the portion 802 of the analog contact signal 802 has low fluctuation during an idle mode with no touchdown, as there is no interference caused by write current.

On the other hand, as shown in FIG. 11, when the storage device is operating in write mode and touchdown occurs, a portion 1110 of the analog contact sensor signal 1100 between two successive portions 1120 and 1130 of the analog contact sensor signal 1100 (which correspond to successive servo gates operations) manifests a significant resonant component (sinusoid) having a relatively large amplitude fluctuation, similar to the signal fluctuation shown in the analog contact signal waveforms of FIG. 9 for touchdown during an idle mode.

As such, when touchdown occurs during a write mode, the resulting analog contact sensor signal 1100 as shown in FIG. 11 is not as affected by noise due to write current. However, the signal noise that interferes in the analog contact sensor signal as illustrated in FIG. 10 can result in an increase in the computed modulation depth for the given segment of contact sensor signal data between successive servo operations, which can degrade touchdown detection performance using a resonance detection scheme as discussed above.

In one embodiment of the invention, the signal interference (as depicted in FIG. 10) is minimized by using the high pass filter circuitry 310 in the analog front-end circuitry 220, as shown in FIG. 3. For example, the write interference that occurs in an analog contact sensor signal during a write mode is due to a fundamental tone of the servo function frequency, which in some storage devices is 79 kHz, for example. As a transient outlier of this frequency is triangular, the high frequency harmonics decrease as the square of the harmonic (e.g., 1, ⅑, ¹⁄₂₅, etc.). Assuming a touch down resonance frequency is about 450 kHz, the fundamental frequency and the $3^{rd}$ harmonic can be removed using the high pass filter circuitry 310. While high pass filtering can remove a significant amount of noise in the analog contact sensor signal as shown in FIG. 10, any remaining noise can still degrade touchdown detection using a resonance detection scheme (as outlined above) which computes a single modulation depth value for each segment of a contact sensor signal between successive servo gate operations.

In another embodiment of the invention, to improve performance of the contact detection scheme outlined above, rather than compute a single modulation depth value for an entire segment of contact sensor signal data between successive servo gate operations, an given segment of contact sensor signal data between successive servo gate operations is divided into a plurality of smaller segments, and a modulation depth is computed for each smaller segment, and the modulation depths computed for each of the smaller segments are combined using a weighting function (e.g., computing an average of the modulation depths of the segments for the given entire segment). This concept is schematically illustrated in FIG. 12, and will be explained in further detail below with reference to the flow diagrams of FIGS. 5 and 6.

Figure 12:
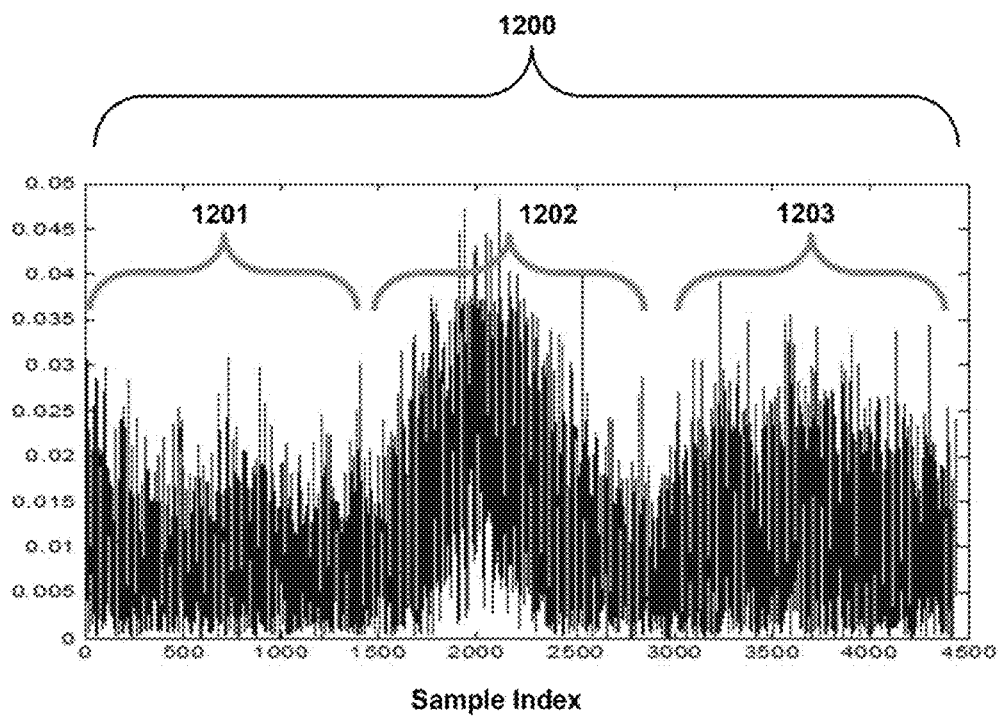
FIG. 12 graphically illustrates an absolute value of a segment of an analog contact sensor signal that is segmented into three smaller segments for computing a combined modulation depth according to an embodiment of the invention.

In particular, FIG. 12 graphically illustrates an absolute value of a segment of an analog contact sensor signal 1200 which is segmented into three smaller segments 1201, 1202 and 1203, for computing a combined modulation depth, according to an embodiment of the invention. In particular, FIG. 12 illustrates the absolute values of an entire segment 1200 of an analog contact signal as measured during a write mode between two successive servo operations with no touchdown, and as filtered using a high pass filter to suppress noise resulting from the write operation. As discussed above with reference to FIG. 10, the noise that is generated during a write mode has a low frequency primary component, as well as low frequency residual components. In this regard, the noise components cannot equally affect each segment 1201, 1202, and 1203 of the entire segment 1200 of the contact sensor signal between successive servo operations.

By way of specific example, as shown in FIG. 12, the different segments 1201, 1202, and 1203 of the entire segment 1200 have different levels of signal fluctuation. For example, the segments 1201 and 1203 each have a flat amplitude fluctuation, which would result in a small modulation depth computed for the segments 1201 and 1203. On the other hand, the segment 1202 has a relatively larger amplitude fluctuation (as compared to segments 1201 and 1203), which would result in a larger modulated depth computed for the segment 1202. If one modulation depth MD value was computed over the entire segment 1200 of FIG. 12 using the MD computation method as outlined above, the noise components present in the smaller segment 1202 portion of the segment 1200 would undesirably reduce the computed MD value for the segment 1200, which could degrade the touchdown detection process.

On the other hand, by dividing the given segment 1200 of contact sensor signal data (between successive servo operations) into smaller segments 1201, 1202, and 1203, such as depicted in FIG. 12, a separate modulation depth can be computed for each smaller segment 1201, 1202, and 1203. The different modulation depths for these smaller segments' 1201, 1202, and 1203 can be combined according to some weighting function (e.g., average) to computed a combined modulation depth for the given segment 1200. This combined modulation depth computation process serves to minimize the adverse effects on the MD computation due to the noise components that are locally present in smaller portions/segments of the contact sensor signal data segment 1200.

Figure 5:
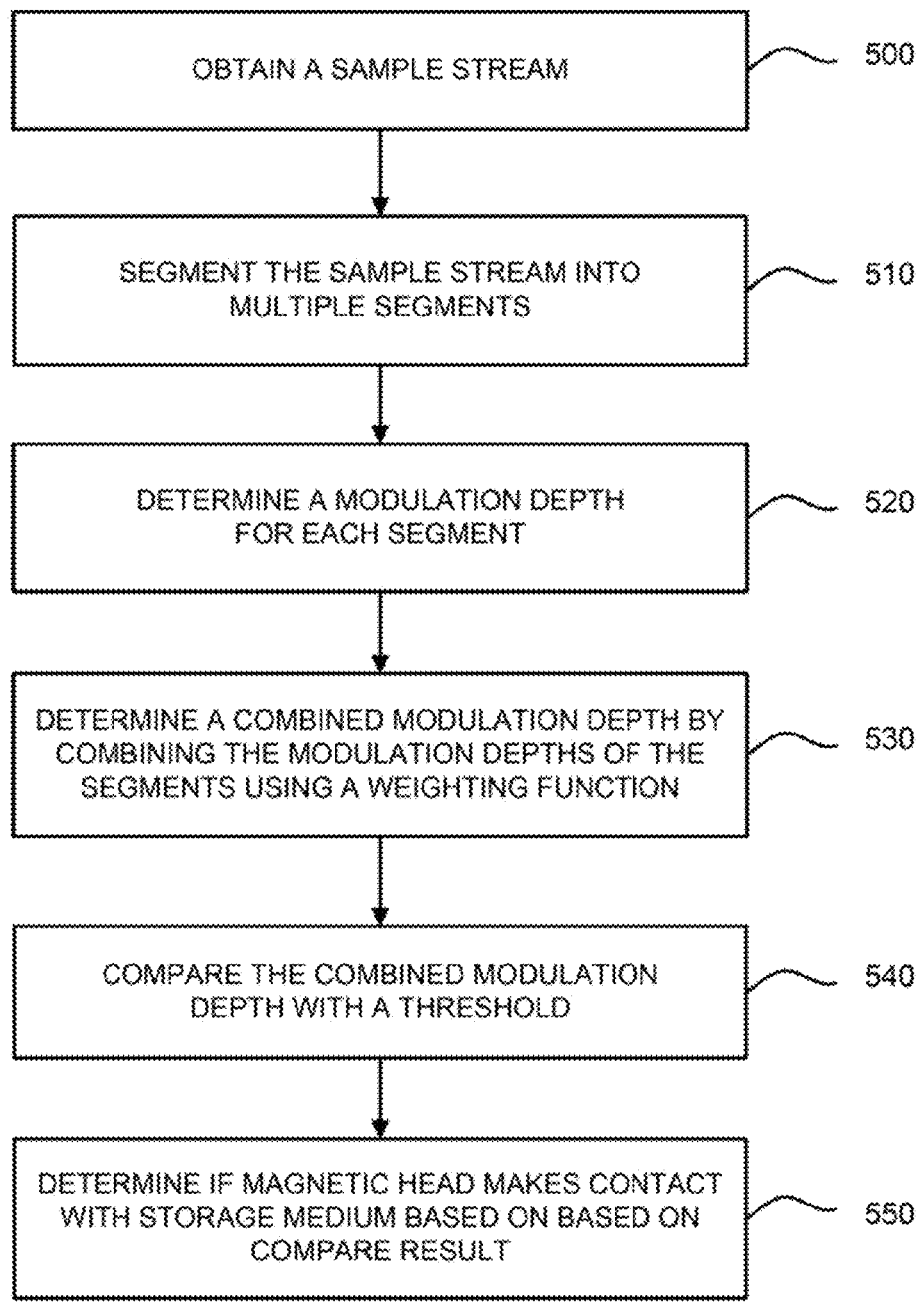
FIG. 5 is a flow diagram of a method to detect contact between a magnetic head and a storage medium, according to an embodiment of the invention.

FIG. 5 is a flow diagram of a method to detect contact between a magnetic head and a storage medium, according to an embodiment of the invention. In particular, FIG. 5 illustrates a method for implementing a resonance contact detection scheme using a combined modulation depth according to an embodiment of the invention. It is to be understood that the method of FIG. 5 is an example mode of operation of the resonance contact detection circuitry 200 depicted in FIG. 4 and, therefore, the method of FIG. 5 will be discussed in conjunction FIG. 4. Referring to FIG. 5, an initial step is to obtain a sample stream comprising samples of a sensor signal output from the embedded contact sensor (block 500). As shown in FIG. 4, the resonance contact detection circuitry 200 receives a sample stream and temporarily stores the sample stream in the sample stream buffer 400. The sample stream includes a given segment x of digital samples of a contact sensor signal that is captured between successive servo operations during a write mode or idle mode of operation, wherein the given segment x comprises M samples, i.e.: $x=[x_1, x_2, \ldots, x_M]$.

Next, the sample stream segment x is segmented into multiple segments (block 510). In one embodiment of the invention, the segmentation process is implemented by the sample stream segmentation circuitry 410 of FIG. 4. In addition, FIG. 12 as discussed above illustrates an example process of segmenting a given sample stream segment 1200 into multiple smaller segments 1201, 1202, and 1203. In one embodiment of the invention, a segmentation process is performed such a given sample stream segment x is divided into S segments such that each of the S segments includes at least one full cycle of samples of the sensor signal output from the embedded contact sensor between successive servo operations. In particular, depending on the operating resonant frequency, an embedded contact sensor signal will have a given number full cycles between two successive servo operations.

By way of example, the portion 1110 of the analog contact sensor signal 1100 depicted in FIG. 11 between successive portions 1120 and 1130 (corresponding to successive servo operations) consists of more than 4 full sinusoidal cycles (but less than 5 cycles.). In this regard, if the portion 1110 (entire segment) of the analog contact sensor signal 1100 is divided into 4 or less smaller segments, each segment will include at least one full cycle of data samples of the analog contact sensor signal 1100 between successive servo operations. Accordingly, each segment will have a significant and similar fluctuation (similar distribution of sample values), which will result in similar computed MD values for the different segments. This segmentation process serves to preserve the effectiveness of utilizing a combined modulation depth computation for resonance contact detection by combining the modulation depth values for the different segments.

A next step in the exemplary process of FIG. 5 is to determine a modulation depth for each of the smaller segments of the given sample stream segment (block 520). In one embodiment of the invention, a modulation depth computation process (in block 520) is implemented by the modulation depth computation circuitry 420 (FIG. 4) using a modulation depth computation process as discussed above with reference to Equations (1), (2), (3) and (4). By way of illustration, FIG. 6 is a flow diagram of a method to determine a modulation depth for segments of a contact sensor signal sample stream segment, which can be implemented in block 520 of FIG. 5, according to an embodiment of the invention.

Figure 6:
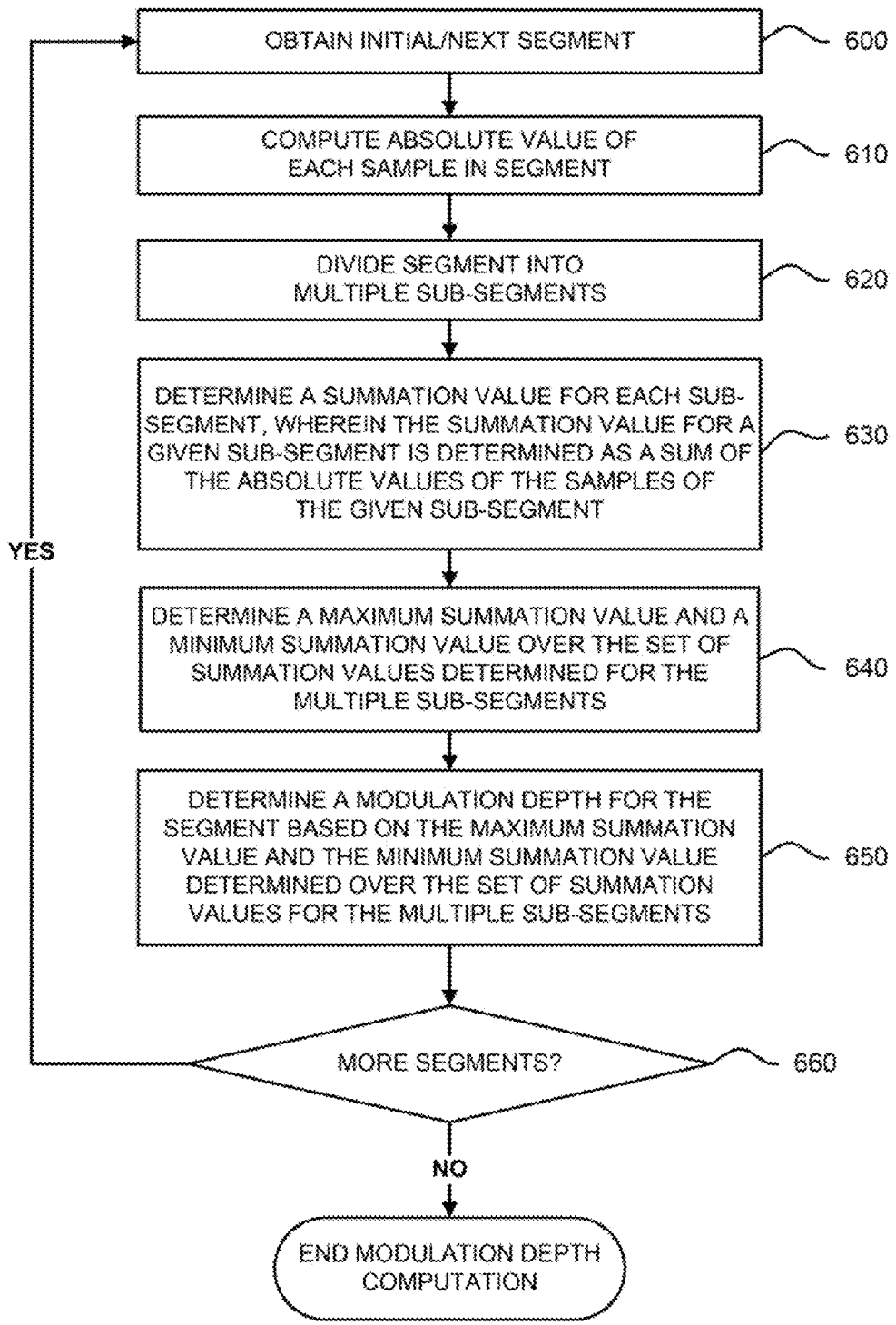
FIG. 6 is a flow diagram of a method to determine a modulation depth for segments of a contact sensor signal sample stream, which can be implemented in block 520 of FIG. 5, according to an embodiment of the invention.

Referring to FIG. 6, an initial step is to obtain one of the smaller segments of a given sample stream segment (600). By way of example, in the embodiment shown in FIG. 12, each of the smaller segments 1201, 1202, and 1203 of the given sample segment 1200 would be separately processed using the method of FIG. 6 to compute a modulation depth for each segment 1201, 1202, and 1203. For a given segment, an absolute value is computed for each sample in the given segment (block 610). The given segment is then divided into smaller sub-segments (block 620) and a summation value is determined for each sub-segment using Equation (1) above, for example, wherein the summation value for a given sub-segment is determined as a sum of the absolute values of the samples of the given sub-segment (block 630). Next, a maximum summation value and a minimum summation value are determined (using above Equations (2) and (3)) over the set of summation values determined for the multiple sub-segments of the given segment (block 640). Thereafter, a modulation depth MD is determined for the given segment (using the above Equation (4)) based on the maximum and minimum summation values as determined over the set of summation values for the sub-segments of the given segment (block 650).

If more segments exist for the given segment x being processed (block 660), the next segment is obtained (block 600) and the process (blocks 610, 620, 630, 640 and 650) is repeated for the next segment and all remaining segments. For example, with regard to the example embodiment of FIG. 12, each smaller segment 1201, 1202, 1203 of the entire segment 1200 would be processed using the method of FIG. 6 so as to compute a separate modulation depth for each of the smaller segments 1201, 102, and 1203 of the given segment 1200.

When a modulation depth MD has been determined for each smaller segment of a given segment, process of FIG. 6 terminates, and the process flow returns to FIG. 5, wherein a combined modulation depth is determined for the given segment x by combining the modulation depths of the corresponding set of smaller segments using a weighting function (block 530). In one embodiment of the invention, this process is implemented by the modulation depth combining circuitry 430 (FIG. 4). In one embodiment of the invention, a process of determining a combined modulation depth comprises determining an average modulation depth by averaging the modulation depths of the segments. For example, in the embodiment of FIG. 12, assuming that a modulation depth MD1 is computed for the first segment 1201, a modulation depth MD2 is computed for the second segment 1202, and a modulation depth MD3 is computed for the third segment 1203, an average modulation depth for the given segment 1200 would be computed as $$MD = \frac{MD1 + MD2 + MD3}{3}.$$

In this embodiment, the modulation depth combining circuitry 430 would include one or more register (accumulator circuitry) and division circuitry configured to implement a method for averaging the modulation depths of the segments, using know circuits and methods.

In another embodiment, a combined modulation depth is computed by assigning different weights to the different modulation depth MD values computed for the different segments, e.g., (w1*MD1)+(w2*MD2)+(w3*MD3), wherein the weights w1, w2, w3 are not equal, but wherein w1+w2+w3=1. These weights can be predetermined based on statistical analyses that are performed when configuring a storage device during manufacturing, for example. Other weighting functions can be applied depending on the specific application and specific characteristics of the storage device in which touchdown detection techniques according to embodiments of the invention are deployed.

Once a combined modulation depth is determined for the given sample stream segment x, the combined modulation depth is compared with a threshold (block 540) and a determination is made as to whether or not the magnetic head makes contact with the storage medium based on a result of such comparison (block 550). In one embodiment, this process is implemented by the threshold comparison circuitry 440 (FIG. 4). By way of example, a combined modulation depth value (as computed) is compared to a predetermined threshold value, and touchdown event is determined to occur when the combined modulation depth value meets or exceeds the predetermined threshold value.

Figure 7:
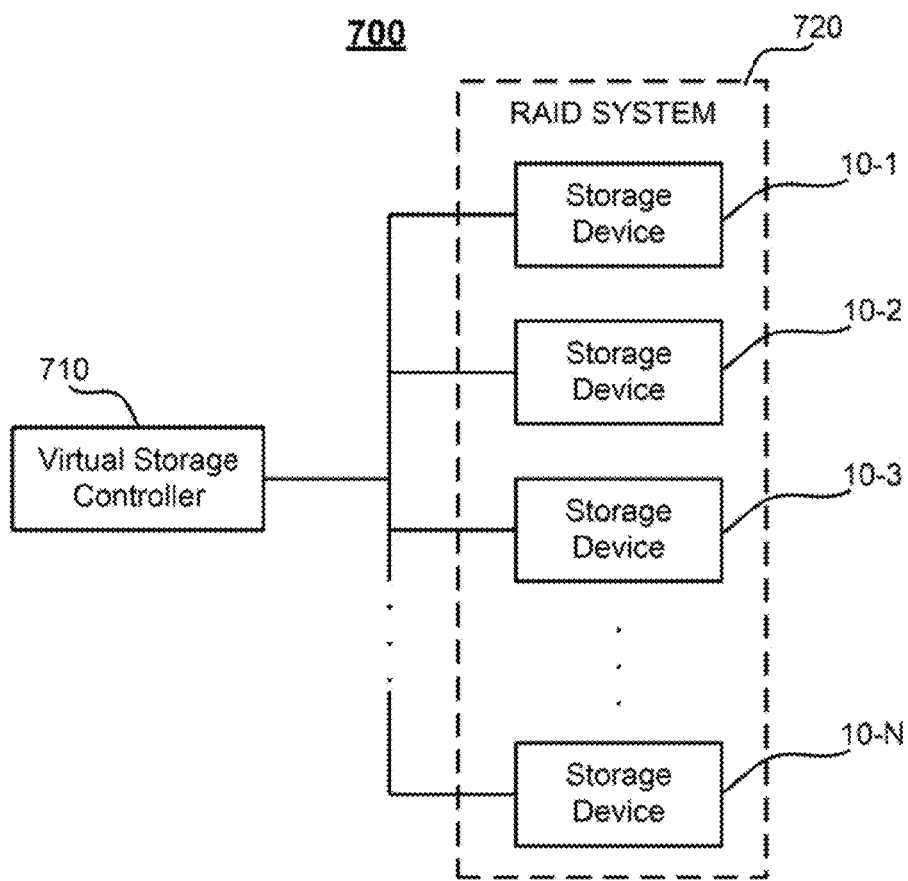
FIG. 7 shows a virtual storage system incorporating a plurality of disk-based storage devices of the type shown in FIG. 1.

In other embodiments of the invention, multiple disk-based storage devices 10 (FIG. 1) may be incorporated into a virtual storage system 700 as illustrated in FIG. 7. The virtual storage system 700, also referred to as a storage virtualization system, illustratively comprises a virtual storage controller 710 coupled to a RAID system 720, where RAID denotes Redundant Array of Independent Disks. The RAID system more specifically comprises N distinct storage devices denoted 10-1, 10-2, . . . , 10-N, one or more of which are assumed to be configured to include embodiments of the storage device 10 as shown in FIG. 1 with circuitry for performing a contact detection process using a combined modulation depth resonance detection scheme as discussed herein. These and other virtual storage systems comprising hard disk drives or other disk-based storage devices of the type disclosed herein are considered embodiments of the invention. A host processing device may also be an element of a virtual storage system, and may incorporate the virtual storage controller 710.

To illustrate the advantages of implementing a resonance contact detection scheme with a combined modulation depth computation process, various experiments were conducted to show how a combined modulation depth computation process can provide improved touchdown detection in the presence of noise or signal interferences within embedded contact sensor signals. The results of such experimentation are graphically depicted in FIGS. 13, 14, 15, 16, 17 and 18, for example.

Figure 13:
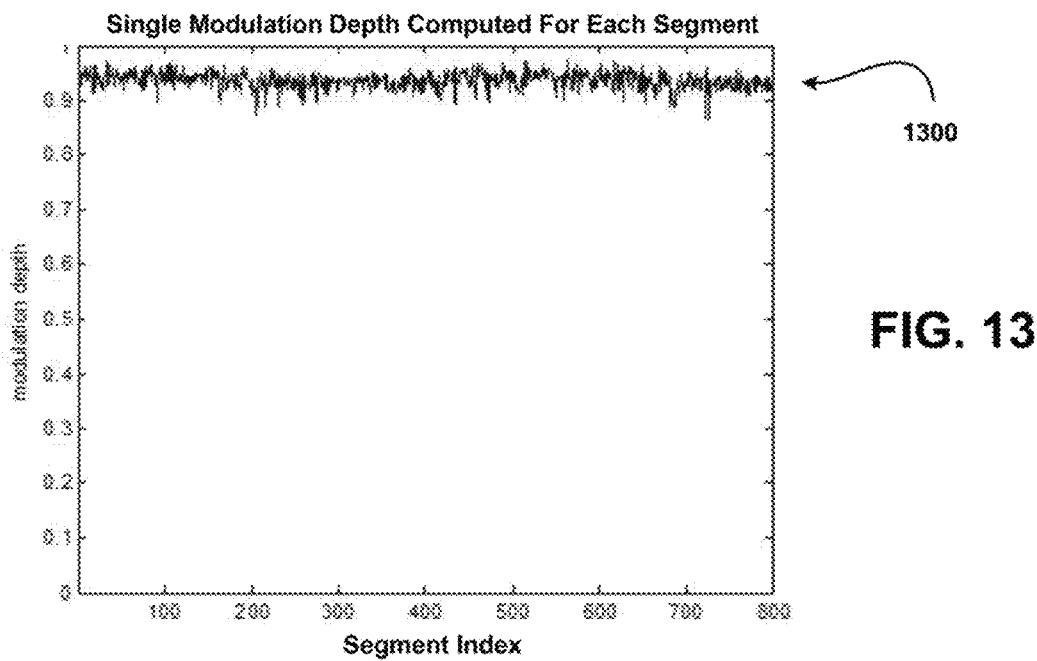
FIG. 13 graphically illustrates modulation depths computed using a resonance detector in which a single modulation depth was computed for each segment of an analog contact sensor signal as measured during a write mode of operation with contact made between a magnetic head and storage medium.
Figure 14:
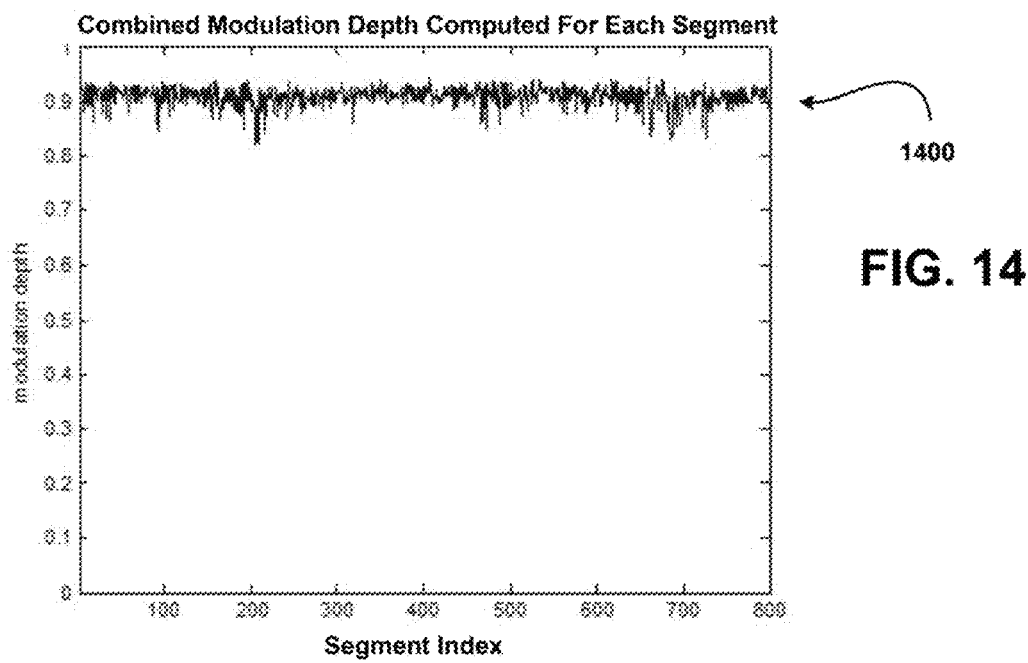
FIG. 14 graphically illustrates modulation depths computed using a resonance detector according to an embodiment of the invention in which a combined modulation depth was computed for each segment of the same analog contact sensor signal used for the computations shown in FIG. 13.

For example, FIG. 13 graphically illustrates modulation depths computed using a resonance detector in which a single modulation depth was computed for each segment of an analog contact sensor signal as measured during a write mode of operation with contact made between a magnetic head and storage medium. FIG. 14 graphically illustrates modulation depths computed using a resonance detector according to an embodiment of the invention in which a combined modulation depth was computed for each segment of the same analog contact sensor signal used for the computations shown in FIG. 13. Collectively, FIGS. 13 and 14 illustrate that a combined modulation depth computation process for touchdown detection can achieve similar modulation depth values as the single modulation depth computation scheme for touchdown conditions.

More specifically, FIG. 13 illustrates a series of modulation depths 1300 that were computed for each of 800 segments of samples of an analog contact sensor signal (with segment samples measured between servo operations during a write mode), wherein for each segment, a single modulation depth was computed over all samples of the segment using the modulation depth computation process as discussed above with reference to Equations (1), (2), (3) and (4). As shown in FIG. 13, the computed modulation depths 1300 fell within a range between 0.9 and 1. Similarly, FIG. 14 illustrates a series of combined modulation depths 1400 that were computed for each of the same 800 segments of samples of the same analog contact sensor signal, wherein for each segment, a combined modulation depth was computed using the process described above with reference to FIGS. 5 and 6, for example, with each segment divided into 3 segments. As shown in FIG. 14, the combined modulation depths 1400 fell within a range between 0.8 and 1, thereby illustrating that similar modulations depths are computed for a touchdown detection event for the single and combined modulation depth computation schemes.

Figure 15:
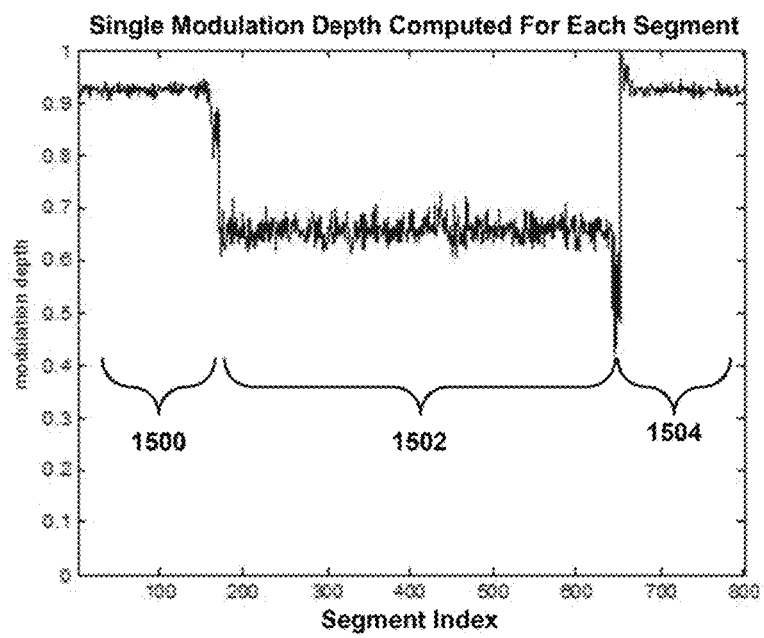
FIG. 15 graphically illustrates modulation depths computed using a resonance detector in which a single modulation depth was computed for each segment of an analog contact sensor signal as measured during a write mode of operation.
Figure 16:
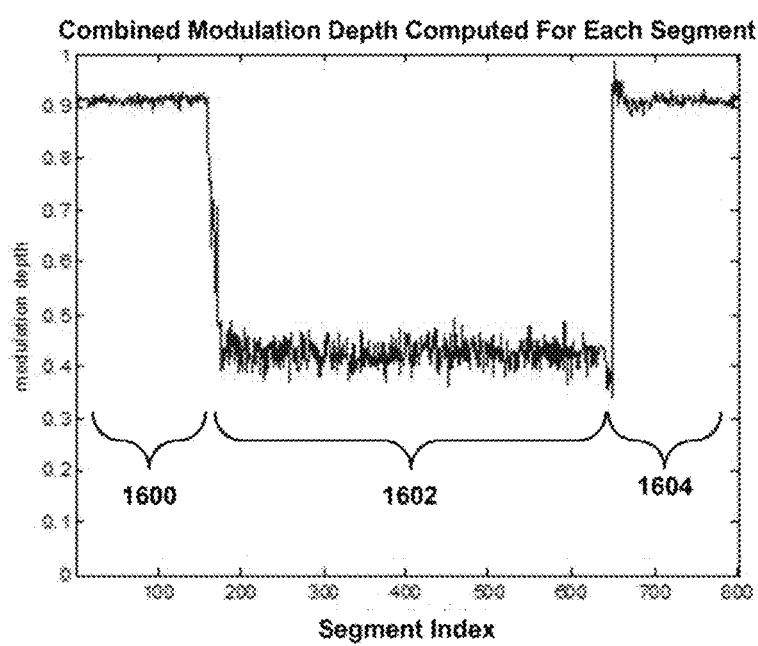
FIG. 16 graphically illustrates modulation depths computed using a resonance detector according to an embodiment of the invention in which a combined modulation depth was computed for each segment of the same analog contact sensor signal used for the computations shown in FIG. 15.

Next, FIG. 15 graphically illustrates modulation depths computed using a resonance detector in which a single modulation depth was computed for each segment of an analog contact sensor signal as measured during a write mode of operation. Moreover, FIG. 16 graphically illustrates modulation depths computed using a resonance detector according to an embodiment of the invention in which a combined modulation depth was computed for each segment of the same analog contact sensor signal used for the computations shown in FIG. 15. Collectively, FIGS. 15 and 16 illustrate that a combined modulation depth computation process can provide a significant reduction in the computed modulation depth, as compared to the single modulation depth computation scheme, for non-touchdown conditions.

More specifically, FIG. 15 illustrates a series of modulation depths that were computed for each of 800 segments of samples of an analog contact sensor signal (with segment samples measured between servo operations during a write mode), wherein for each segment, a single modulation depth was computed over all samples of the segment using the modulation depth computation process as discussed above with reference to Equations (1), (2), (3) and (4). As shown in FIG. 15, some of the single modulation depths were computed for those segments 1500 and 1504 in which touchdown occurred during a write mode, and for other segments 1502 in which no touchdown occurred during a write mode. Similarly, FIG. 16 illustrates a series of combined modulation depths that were computed for each of the same 800 segments of samples of the same analog contact sensor signal, wherein for each segment, a combined modulation depth was computed using the process described above with reference to FIGS. 5 and 6, for example, with each segment divided into 3 segments. As shown in FIG. 16, some of the combined modulation depths were computed for those segments 1600 and 1604 in which touchdown occurred during a write mode, and for other segments 1602 in which no touchdown occurred during a write mode.

As shown in FIG. 15, the single modulation depths computed for those segments 1502 during non-touchdown in a write mode fell within a range between 0.6 and 0.7, with a spike in the computed modulation depths falling to about 0.4 with segments within range of segment indexes around 650. In contrast, FIG. 16 shows that the combined modulation depths computed for those segments 1602 during non-touchdown in the write mode fell within a lower range of between 0.4 and 0.5. Accordingly, FIGS. 15 and 16 illustrate that as compared to the single modulation depth computation process (FIG. 15), a significant reduction in the modulation depth can be achieved for a touchdown-free case during write mode using a combined modulation depth computation process according to an embodiment of the invention.

Figure 17:
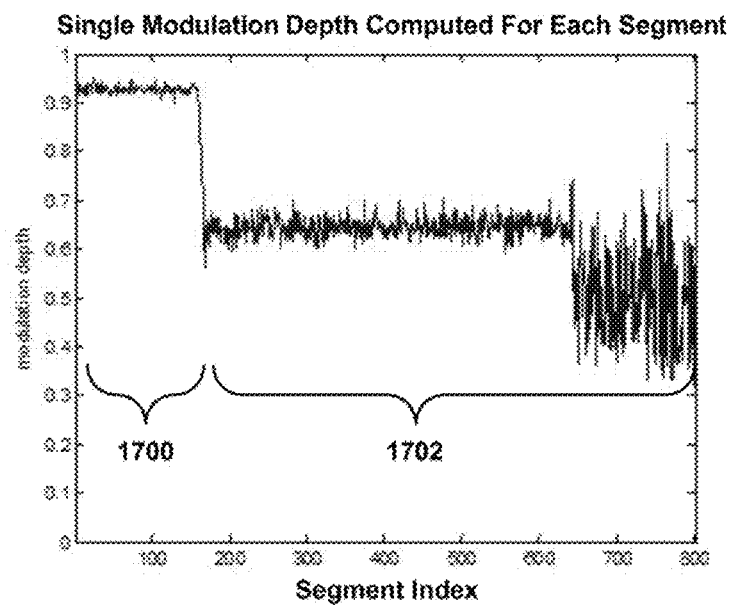
FIG. 17 graphically illustrates modulation depths computed using a resonance detector in which a single modulation depth was computed for each segment of an analog contact sensor signal as measured during a write mode of operation.

Furthermore, FIG. 17 graphically illustrates modulation depths computed using a resonance detector in which a single modulation depth was computed for each segment of an analog contact sensor signal as measured during a write mode of operation. Moreover, FIG. 18 graphically illustrates modulation depths computed using a resonance detector according to an embodiment of the invention in which a combined modulation depth was computed for each segment of the same analog contact sensor signal used for the computations shown in FIG. 17. Collectively, FIGS. 17 and 18 further illustrate that a combined modulation depth computation process can provide a significant reduction in the computed modulation depth, as compared to the single modulation depth computation scheme, for non-touchdown conditions.

Figure 18:
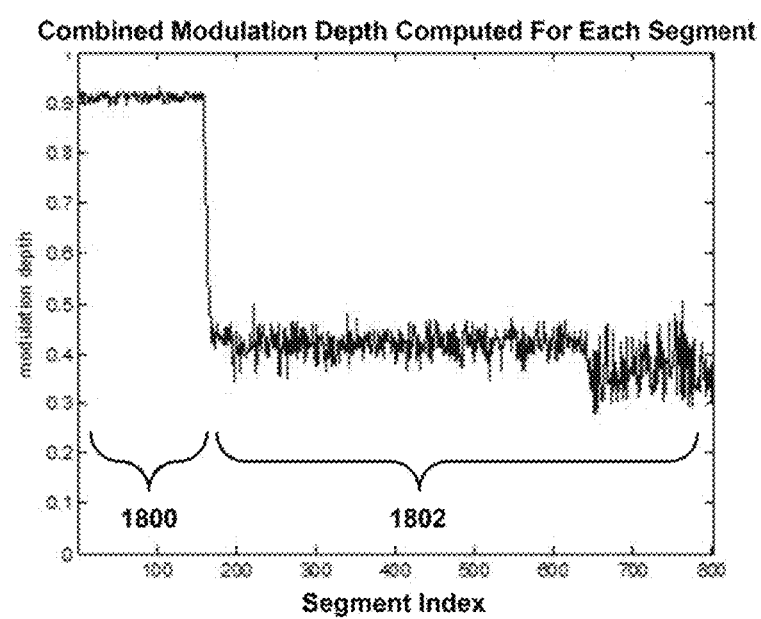
FIG. 18 graphically illustrates modulation depths computed using a resonance detector according to an embodiment of the invention in which a combined modulation depth was computed for each segment of the same analog contact sensor signal used for the computations shown in FIG. 17.

More specifically, FIG. 17 illustrates a series of modulation depths that were computed for each of 800 segments of samples of an analog contact sensor signal (with segment samples measured between servo operations during a write mode), wherein for each segment, a single modulation depth was computed over all samples of the segment using the modulation depth computation process as discussed above with reference to Equations (1), (2), (3) and (4). As shown in FIG. 17, some of the single modulation depths were computed for segments 1700 in which touchdown occurred during a write mode, and for other segments 1702 in which no touchdown occurred during the write mode. Similarly, FIG. 18 illustrates a series of combined modulation depths that were computed for each of the same 800 segments of samples of the same analog contact sensor signal, wherein for each segment, a combined modulation depth was computed using the process described above with reference to FIGS. 5 and 6, for example, with each segment divided into 3 segments. As shown in FIG. 18, some of the combined modulation depths were computed for the 1800 in which touchdown occurred during a write mode, and for other segments 1802 in which no touchdown occurred during a write mode.

As shown in FIG. 17, the single modulation depths computed for those segments 1702 during non-touchdown in a write mode fell within a range between 0.6 and 0.7, with erratic spikes in the computed modulation depths for the segments with a segment index of about 650 to 800. In contrast, FIG. 18 shows that the combined modulation depths computed for the segments 1802 during non-touchdown in the write mode fell within a lower range of between 0.4 and 0.5, with less fluctuation in the computed combined modulation depths for the segments with a segment index of about 650 to 800. Accordingly, FIGS. 17 and 18 further illustrate that as compared to the single modulation depth computation process (FIG. 17), a significant reduction in the modulation depth can be achieved for a touchdown-free case during write mode using a combined modulation depth computation process according to an embodiment of the invention.

Accordingly, as illustrated above, a combined modulation depth computation process according to an embodiment of the invention can be implemented in a resonance contact detection scheme to achieve more reliable touchdown detection, as compared to a single modulation depth computation process. Indeed, as demonstrated by the experimental results presented in FIGS. 13-18, a significant reduction in the modulation depths can be achieved for touchdown-free events during idle and write modes using a combined modulation depth computation scheme, despite noise interference within an embedded contact sensor signal. Moreover, a combined modulation depth computation scheme can achieve similar performance results for detecting touchdown events. as achieved with a single modulation depth computation process. The reduction in the computed modulation depths for touchdown events, which is achieved with use of a combined modulation depth computation process provides more freedom in threshold selection because the lower modulation depths that are computed for touchdown event using a combined modulation depth effectively increase the distance (range) between the modulation depths to discriminate between touchdown and touchdown-free events. Accordingly, a resonance detection scheme that implements a combined modulation depth computation process can provide a more robust detection framework wherein detection performance is guaranteed even when embedded contact sensor signal data is partially contaminated with noise, particular for the touchdown-free condition.

Although embodiments of the invention have been described herein with reference to the accompanying drawings, it is to be understood that embodiments of the invention are not limited to the described embodiments, and that various changes and modifications may be made by one skilled in the art resulting in other embodiments of the invention within the scope of the following claims.

What is claimed is:

1. A method to detect contact between a storage medium and a magnetic head having an embedded contact sensor, the method comprising:
   obtaining a sample stream comprising samples of a sensor signal output from the embedded contact sensor;
   segmenting the sample stream into a plurality of segments;
   determining a modulation depth for each of the segments;
   determining a combined modulation depth by combining the modulation depths of the segments using a weighting function;
   comparing the combined modulation depth with a threshold; and
   determining if the magnetic head makes contact with the storage medium based on a result of the comparing.

2. The method of claim 1, wherein determining a combined modulation depth comprises determining an average modulation depth by averaging the modulation depths of the segments, wherein the average modulation depth is compared with the threshold to determine if the magnetic head makes contact with the storage medium.

3. The method of claim 1, wherein obtaining a sample stream comprises:
   analog signal processing the sensor signal output from the embedded contact sensor; and
   analog-to-digital converting the sensor signal into a time-sequenced digital signal comprising samples of the sensor signal.

4. The method of claim 3, wherein analog processing the sensor signal comprises high-pass filtering the sensor signal.

5. The method of claim 1, wherein obtaining a sample stream comprises obtaining a portion of the sensor signal which is generated and output from the embedded contact sensor between successive servo operations during an idle mode and between successive servo operations during a write mode.

6. The method of claim 1, wherein segmenting the sample stream into a plurality of segments comprises dividing the sample stream into S segments such that each of the S segments includes at least one full cycle of samples of the sensor signal output from the embedded contact sensor between successive servo operations.

7. The method of claim 1, wherein determining a modulation depth for each of the segments comprises:
   segmenting each segment into a plurality of sub-segments; and
   for each segment,
      determining a summation value for each of the sub-segments associated with the given segment, wherein the summation value for a given sub-segment is determined as a summation of absolute values of samples of the given sub-segment;
      determining a maximum summation value and a minimum summation value over the set of summation values determined for the plurality of sub-segments associated with the given segment; and
      determining a modulation depth for the given segment based on the maximum summation value and the minimum summation value determined for the plurality of sub-segments associated with the given segment.

8. A circuit to detect contact between a storage medium and a magnetic head having an embedded contact sensor, the circuit comprising:
   analog processing circuitry configured to process a sensor signal output from the embedded contact sensor;
   analog-to-digital converter circuitry configured to generate a sample stream from the sensor signal, wherein the sample stream comprises a time-sequenced digital signal comprising samples of the sensor signal; and
   contact detection circuitry configured to detect if the magnetic head makes contact with the storage medium, the contact detection circuitry comprising:
      segmentation circuitry configured to segment the sample stream into a plurality of segments;

modulation depth computation circuitry configured to compute a modulation depth for each of the segments;
modulation depth combining circuitry configured to determine a combined modulation depth by combining the modulation depths of the segments using a weighting function; and
comparison circuitry configured to compare the combined modulation depth with a threshold,
wherein the contact detection circuitry is configured to determine if the magnetic head makes contact with the storage medium based on a comparing result output from the comparison circuitry.

9. The circuit of claim 8, wherein the modulation depth combining circuitry comprises accumulator and division circuitry that is configured to determine an average modulation depth by averaging the modulation depths of the segments, wherein the average modulation depth is compared with the threshold to determine if the magnetic head makes contact to the storage medium.

10. The circuit of claim 8, wherein the analog processing circuitry comprises a high-pass filter configured to filter the analog sensor signal.

11. The circuit of claim 8, further comprising preamplifier circuitry, wherein the preamplifier circuitry comprises:
amplifier circuitry configured to amplify the sensor signal output from the embedded contact sensor; and
switching circuitry connected to an output of the amplifier circuitry, wherein the switching circuitry is configured to switchably connect the output of the amplifier circuitry to the analog processing circuitry to process portions of the sensor signal between successive servo operations during an idle mode and between successive servo operations during a write mode.

12. The circuit of claim 8, wherein the segmentation circuitry is configured to segment the sample stream into S segments such that each of the S segments includes at least one full cycle of samples of the sensor signal output from the embedded contact sensor between successive servo operations.

13. The circuit of claim 8, wherein the modulation depth computation circuitry is configured to:
segment each segment into a plurality of sub-segments; and
for each segment,
determine a summation value for each of the sub-segments associated with the given segment, wherein the summation value for a given sub-segment is determined as a summation of absolute values of samples of the given sub-segment;
determine a maximum summation value and a minimum summation value over the set of summation values determined for the plurality of sub-segments associated with the given segment; and
determine a modulation depth for the given segment based on the maximum summation value and the minimum summation value determined for the plurality of sub-segments associated with the given segment.

14. A read channel integrated circuit comprising the circuit of claim 8.

15. A storage device comprising:
a storage medium;
a magnetic head comprising an embedded contact sensor; and
read channel circuitry, wherein the read channel circuitry comprises:
analog processing circuitry configured to process a sensor signal output from the embedded contact sensor;
analog-to-digital converter circuitry configured to generate a sample stream from the sensor signal, wherein the sample stream comprises a time-sequenced digital signal comprising samples of the sensor signal; and
contact detection circuitry configured to detect if the magnetic head makes contact to the storage medium, the contact detection circuitry comprising:
segmentation circuitry configured to segment the sample stream into a plurality of segments;
modulation depth computation circuitry configured to compute a modulation depth for each of the segments;
modulation depth combining circuitry configured to determine a combined modulation depth by combining the modulation depths of the segments using a weighting function; and
comparison circuitry configured to compare the combined modulation depth with a threshold,
wherein the contact detection circuitry is configured to determine if the magnetic head makes contact with the storage medium based on a comparing result output from the comparison circuitry.

16. The storage device circuit of claim 15, wherein the modulation depth combining circuitry comprises accumulator and division circuitry which is configured to determine an average modulation depth by averaging the modulation depths of the segments, wherein the average modulation depth is compared with the threshold to determine if the magnetic head makes contact with the storage medium.

17. The storage device of claim 15, wherein the analog processing circuitry comprises a high-pass filter configured to filter the sensor signal.

18. The storage device of claim 15, further comprising preamplifier circuitry, wherein the preamplifier circuitry comprises:
amplifier circuitry configured to amplify the sensor signal output from the embedded contact sensor; and
switching circuitry connected to an output of the amplifier circuitry, wherein the switching circuitry is configured to switchably connect the output of the amplifier circuitry to the analog processing circuitry to process portions of the sensor signal between successive servo operations during an idle mode and between successive servo operations during a write mode.

19. The storage device of claim 15, wherein the modulation depth computation circuitry is configured to:
segment each segment into a plurality of sub-segments; and
for each segment,
determine a summation value for each of the sub-segments associated with the given segment, wherein the summation value for a given sub-segment is determined as a summation of absolute values of samples of the given sub-segment;
determine a maximum summation value and a minimum summation value over the set of summation values determined for the plurality of sub-segments associated with the given segment; and
determine a modulation depth for the given segment based on the maximum summation value and the minimum summation value determined for the plurality of sub-segments associated with the given segment.

20. A virtual storage system comprising the storage device of claim 15.

* * * * *